(12) United States Patent
Yu

(10) Patent No.: US 12,452,959 B2
(45) Date of Patent: Oct. 21, 2025

(54) HAIRDRYER CONTROL METHOD, DEVICE AND STORAGE MEDIUM

(71) Applicant: DREAME TECHNOLOGY (SHANGHAI) CO., LTD., Shanghai (CN)

(72) Inventor: Hao Yu, Shanghai (CN)

(73) Assignee: DREAME TECHNOLOGY (SHANGHAI) CO., LTD., Shanghai (CN)

( * ) Notice: Subject to any disclaimer, the term of this patent is extended or adjusted under 35 U.S.C. 154(b) by 919 days.

(21) Appl. No.: 17/636,355

(22) PCT Filed: Nov. 11, 2020

(86) PCT No.: PCT/CN2020/128211
§ 371 (c)(1),
(2) Date: Feb. 17, 2022

(87) PCT Pub. No.: WO2021/129211
PCT Pub. Date: Jul. 1, 2021

(65) Prior Publication Data
US 2022/0290897 A1   Sep. 15, 2022

(30) Foreign Application Priority Data

Dec. 24, 2019 (CN) .................. 201911347417.4
Dec. 24, 2019 (CN) .................. 201911348963.X
Dec. 24, 2019 (CN) .................. 201911350010.7
Dec. 24, 2019 (CN) .................. 201911350830.6
Dec. 24, 2019 (CN) .................. 201911350834.4

(51) Int. Cl.
*H05B 1/02* (2006.01)
*A45D 20/10* (2006.01)

(52) U.S. Cl.
CPC ............... *H05B 1/02* (2013.01); *A45D 20/10* (2013.01)

(58) Field of Classification Search
CPC ........ A45D 20/10; A45D 20/00; A45D 20/30; H05B 1/02; H05B 1/0252; F04D 25/08
See application file for complete search history.

(56) References Cited

U.S. PATENT DOCUMENTS

| | | |
|---|---|---|
| 2016/0316883 A1 | 11/2016 | Guerra et al. |
| 2016/0335815 A1 | 11/2016 | Ryu et al. |
| 2019/0142132 A1 | 5/2019 | Nelson et al. |

FOREIGN PATENT DOCUMENTS

| | | |
|---|---|---|
| CN | 2001-37531 A | 2/2001 |
| CN | 2679573 Y | 2/2005 |

(Continued)

OTHER PUBLICATIONS

Translation, KR-20190059981-A (Year: 2019).*
Translation, CN-107510208-A (Year: 2017).*

*Primary Examiner* — Jessica Yuen
(74) *Attorney, Agent, or Firm* — Bayramoglu Law Offices

(57) ABSTRACT

The present disclosure relates to a hairdryer control method, a device and a storage medium. The hairdryer control method includes following steps: receiving a hairdryer turn-off signal for stopping the hairdryer; detecting whether or not there is a power down task, and executing the power down task when the power down task is detected. As a result, impact on the driving process of the hairdryer caused by some tasks being executed when the hairdryer is turned on can be avoided.

17 Claims, 12 Drawing Sheets

(56) References Cited

FOREIGN PATENT DOCUMENTS

| | | | |
|---|---|---|---|
| CN | 1957796 A | 5/2007 |
| CN | 200946918 Y | 9/2007 |
| CN | 101176433 A | 5/2008 |
| CN | 101303021 A | 11/2008 |
| CN | 201555356 U | 8/2010 |
| CN | 101846092 A | 9/2010 |
| CN | 103199831 A | 7/2013 |
| CN | 103271532 A | 9/2013 |
| CN | 104296310 A | 1/2015 |
| CN | 204317817 U | 5/2015 |
| CN | 104863881 A | 8/2015 |
| CN | 204963231 U | 1/2016 |
| CN | 105411149 A | 3/2016 |
| CN | 105571059 A | 5/2016 |
| CN | 205624984 U | 10/2016 |
| CN | 106230420 A | 12/2016 |
| CN | 206042390 U | 3/2017 |
| CN | 106557438 A | 4/2017 |
| CN | 107397323 A | 11/2017 |
| CN | 107510208 A * | 12/2017 |
| CN | 105022701 B | 3/2018 |
| CN | 108193461 A | 6/2018 |
| CN | 108206551 A | 6/2018 |
| CN | 109210680 A | 1/2019 |
| CN | 208301203 U | 1/2019 |
| CN | 109875217 A | 6/2019 |
| CN | 110013097 A | 7/2019 |
| CN | 110425632 A | 11/2019 |
| CN | 111089426 A | 5/2020 |
| CN | 111102750 A | 5/2020 |
| CN | 111140529 A | 5/2020 |
| CN | 111141034 A | 5/2020 |
| CN | 111142040 A | 5/2020 |
| EP | 672871 A1 | 9/1995 |
| EP | 2604760 A1 | 6/2013 |
| JP | S57-14308 A | 1/1982 |
| JP | S61-157403 U | 9/1986 |
| JP | H8-98715 A | 4/1996 |
| JP | 2017-196020 | 11/2017 |
| KR | 20190059981 A * | 5/2019 |
| WO | 95/31915 A1 | 11/1995 |
| WO | 2019/186793 A1 | 10/2019 |

* cited by examiner

HAIRDRYER CONTROL METHOD, DEVICE AND STORAGE MEDIUM

CROSS REFERENCE TO RELATED APPLICATIONS

The present application is a 35 U.S.C. § 371 National Phase conversion of International (PCT) Patent Application No. PCT/CN2020/128211, filed on Nov. 11, 2020, which claims benefit of a Chinese Patent Application No. 201911350010.7, filed on Dec. 24, 2019, a Chinese Patent Application No. 201911348963.X, filed on Dec. 24, 2019, a Chinese Patent Application No. 201911350834.4, filed on Dec. 24, 2019, a Chinese Patent Application No. 201911350830.6, filed on Dec. 24, 2019, a Chinese Patent Application No. 201911347417.4, filed on Dec. 24, 2019, the disclosure of which is incorporated by reference herein. The PCT International Patent Application was filed and published in Chinese.

TECHNICAL FIELD

The present disclosure relates to a hairdryer control method, a device and a storage medium, which belongs to a field of electronic technologies.

BACKGROUND

A motor control application of high-speed hairdryer usually has a large filter capacitor. When a power supply is turned off, the filter capacitor will also store part of the power, which can be used for microcontroller units (MCU) to work for a period of time. In the application of high-speed motor of related technologies, operation of MCU will be stopped when the power is powered off. All operations will be executed when the power supply is powered on. However, if operation such as flash writing is executed while the motor is running, it may interfere with the high-speed timing of motor drive and lead to some errors.

SUMMARY

The present disclosure provides a hairdryer control method, a device and a storage medium, which is capable of reasonably using remaining electric energy after power failure to execute power down task.

An embodiment of the present disclosure provides a hairdryer control method, and the method includes the following steps:
  receiving a hairdryer turn-off signal, the hairdryer turn-off signal being adapted for enabling a hairdryer to stop working;
  detecting whether or not there is a power down task; and
  executing the power down task when the power down task is detected.

In a possible embodiment, the power down task includes a braking task and a flash writing task.

In a possible embodiment, the power down task is stored in a power down file in a form of a queue line.

In a possible embodiment, the method further includes:
  obtaining a current duration; and
  stopping executing the power down task when the current duration is greater than a preset duration.

In a possible embodiment, the power down task is a task which cannot be executed when the hairdryer is turned on.

An embodiment of the present disclosure provides a hairdryer control device, and the device includes:
  a receiving module, the receiving module being adapted to receive a hairdryer turn-off signal, the hairdryer turn-off signal being adapted for enabling a hairdryer to stop working; and
  an execution module, the execution module being adapted to detect whether or not there is a power down task; wherein when the power down task is detected, the power down task is executed.

An embodiment of the present disclosure provides a hairdryer control device. The device includes a processor and a memory having a program stored in the memory; wherein the program is loaded and executed by the processor to implement the above hairdryer control method.

An embodiment of the present disclosure provides a computer-readable storage medium. The storage medium includes a program stored in the computer-readable storage medium. When the program is executed by a processor, the program is adapted to implement the above hairdryer control method.

The hairdryer control method, the device, and the storage medium provided by embodiments of the present disclosure avoid the impact on the driving process of the hairdryer caused by some tasks being executed when the hairdryer is turned on, by receiving the hairdryer turn-off signal which is used to enable the hairdryer to stop working; and then detecting whether there is a power down task, and executing the power down task when the power down task is detected.

The hairdryer control method, the device, and the storage medium provided by embodiments of the present disclosure can accurately monitor temperature changes and capture sudden changes in temperature.

An embodiment of the present disclosure provides a hairdryer control method, and the method includes:
  obtaining a temperature detection window, the temperature detection window being adapted to collect temperature values within a preset window duration which is determined based on a current detection time; and
  determining whether a current output temperature of a hairdryer is stable or not based on each temperature value in the temperature detection window.

In a possible embodiment, determining whether the current output temperature of the hairdryer is stable or not based on each temperature value in the temperature detection window, includes:
  obtaining a maximum temperature value and a minimum temperature value in the temperature detection window;
  calculating a difference between the maximum temperature value and the minimum temperature value;
  determining that the current output temperature of the hairdryer is unstable and sending a prompt signal, when the difference is less than a preset desired temperature threshold; and
  determining that the current output temperature of the hairdryer is stable, when the difference is greater than the preset desired temperature threshold.

In a possible embodiment, determining whether the current output temperature of the hairdryer is stable or not based on each temperature value in the temperature detection window, includes:
  obtaining an average temperature value in the temperature detection window;
  determining that the current output temperature of the hairdryer is unstable and sending a prompt signal, when the average temperature value is greater than a preset desired temperature threshold; and determining that the current output temperature of the hairdryer is stable, when the average temperature value is less than the preset desired temperature threshold.

In a possible embodiment, the preset desired temperature threshold is determined based on an average temperature of a corresponding temperature detection window at a previous time.

In a possible embodiment, obtaining the temperature detection window, includes:
determining the current detection time as an upper limit value of the temperature detection window, and determining a time corresponding to a preset window duration before the current detection time as a lower limit value of the temperature detection window, so as to obtain the temperature detection window.

In a possible embodiment, obtaining the temperature detection window, includes:
determining the current detection time as a lower limit value of the temperature detection window, and determining a time corresponding to a preset window duration after the current detection time as an upper limit value of the temperature detection window, so as to obtain the temperature detection window.

In a possible embodiment, the method further includes:
determining whether or not a start-up duration of a heating device reaches a preset duration; and
triggering a step of obtaining the temperature detection window, when the start-up duration of the heating device reaches the preset duration.

An embodiment of the present disclosure provides a hairdryer control device, and the device includes:
an acquisition module, the acquisition module being adapted to obtain a temperature detection window, the temperature detection window being adapted to collect temperature values within a preset window duration which is determined based on a current detection time; and
a control module, the control module being adapted to determine whether or not a current output temperature of a hairdryer is stable based on each temperature value in the temperature detection window.

An embodiment of the present disclosure provides a hairdryer control device. The device includes a processor and a memory having a program stored in the memory. The program is loaded and executed by the processor to implement the above hairdryer control method.

An embodiment of the present disclosure provides a computer-readable storage medium. The storage medium includes a program stored in the computer-readable storage medium; wherein when the program is executed by a processor, the program is adapted to implement the above hairdryer control method.

The hairdryer control method, the device, and the storage medium provided in the embodiments of the present disclosure can accurately monitor temperature changes and capture sudden changes in temperature by obtaining the temperature detection window to collect the temperature values within the preset window duration determined based on the current detection time; and determining whether the current output temperature of the hairdryer is stable or not based on each temperature value in the temperature detection window.

The hairdryer control method, the device, and the storage medium provided in the embodiments of the present disclosure solve the interference caused by the power supply parameter detection when the heating device is working.

An embodiment of the present disclosure provides a hairdryer control method, and the method includes:
starting a heating device and determining a first working duration and a second working duration of the heating device; and
detecting power supply parameters of the heating device during the first working duration.

In a possible embodiment, detecting the power supply parameters of the heating device during the first working duration, includes:
obtaining and detecting power supply voltages of the heating device during the first working duration.

In a possible embodiment, detecting the power supply parameters of the heating device during the first working duration, includes:
obtaining and detecting power supply currents of the heating device during the first working duration.

In a possible embodiment, after the heating device is started, the first working duration and the second working duration form a cycle.

In a possible embodiment, the first working duration is a time when the heating device is in a non-working state.

In a possible embodiment, a calculation method of the first working duration is as follows:
a duration from an end of a last second working duration and a delay of a preset duration to a beginning of a next second working duration is determined as the first working duration.

In a possible embodiment, the second working duration is a time when the heating device is in a working state.

An embodiment of the present disclosure provides a hairdryer control device, and the device includes:
a determination module, the determination module being adapted to determine a first working duration and a second working duration of a heating device after the heating device is started; and
a detection module, the detection module being adapted to detect power supply parameters of the heating device during the first working duration.

An embodiment of the present disclosure provides a hairdryer control device. The device includes a processor and a memory having a program stored in the memory; wherein the program is loaded and executed by the processor to implement the above hairdryer control method.

An embodiment of the present disclosure provides a computer-readable storage medium. The storage medium includes a program stored in the computer-readable storage medium. When the program is executed by a processor, the program is adapted to implement the above hairdryer control method.

The beneficial effects of the present disclosure are: after the heating device is started, the first working duration and the second working duration of the heating device are determined; and the power supply parameters of the heating device during the first working duration are detected, thereby solving the interference caused by the detection of the power supply parameters when the heating device is working.

The hairdryer control method, the device, and the storage medium provided in the embodiments of the present disclosure solve the problem that the sampling temperature of the temperature sensor has an error due to the inconsistency of the air outlet temperature of each part of the air outlet.

An embodiment of the present disclosure provides a hairdryer control method, and the method includes:
obtaining a temperature value at each point of an air outlet of a hairdryer; and adjusting working parameters of a heating device by a control device according to the temperature value obtained at each point of the air outlet of the hairdryer.

In a possible embodiment, adjusting the working parameters of the heating device by the control device according to the temperature value obtained at each point of the air outlet of the hairdryer, includes:

calculating an average value of the temperature value at each point of the air outlet of the hairdryer;

calculating an expected adjustment parameter value of the heating device according to the average value and a temperature control function; and adjusting the working parameters of the heating device by the control device according to the expected adjustment parameter value.

In a possible embodiment, the method further includes:

confirming test interval; and determining whether or not a detection time for a next detection of the temperature value at each point is reached, after the working parameters of the heating device are adjusted by the control device; if yes, triggering a step of "obtaining a temperature value at each point of an air outlet of a hairdryer".

In a possible embodiment, determining whether or not the detection time for the next detection of the temperature value at each point is reached, includes:

starting time calculation from completion of a last adjustment of the working parameters of the heating device; and determining whether or not a calculated time reaches a predetermined duration.

In a possible embodiment, the method further includes:

determining whether or not a starting time of the heating device reaches a preset duration; and triggering a step of "obtaining a temperature value at each point of an air outlet of a hairdryer", when the starting time of the heating device reaches the preset duration.

An embodiment of the present disclosure provides a hairdryer control device, and the device includes:

an acquisition module, the acquisition module being adapted to obtain a temperature value at each point of an air outlet of a hairdryer; and a control module, the control module adjusting working parameters of a heating device according to the temperature value obtained at each point of the air outlet of the hairdryer.

An embodiment of the present disclosure provides a hairdryer control device. The device includes a processor and a memory having a program stored in the memory; wherein the program is loaded and executed by the processor to implement the above hairdryer control method.

An embodiment of the present disclosure provides a computer-readable storage medium. The storage medium includes a program stored in the computer-readable storage medium; wherein when executed by a processor, the program is adapted to implement the above hairdryer control method.

The hairdryer control method, the device and the storage medium provided in the embodiments of the present disclosure solve the problem of the temperature sensor sampling temperature error caused by the inconsistency of the air outlet temperature of each part of the air outlet, by obtaining the temperature value of each point of the air outlet of the hairdryer; and adjusting the working parameters of the heating device by the control device according to the temperature value obtained at each point of the air outlet of the hairdryer.

The hairdryer control method, the device and the storage medium provided in the embodiments of the present disclosure can solve the problem that the hairdryer may be stopped by mistake by using a fixed upper temperature limit value for temperature protection control in high-temperature environments.

An embodiment of the present disclosure provides a hairdryer control method, wherein a temperature sensor is disposed in an air inlet channel of a hairdryer. The hairdryer control method includes:

obtaining an air inlet temperature collected by the temperature sensor in the air inlet channel;

obtaining an upper temperature limit value corresponding to a standard temperature of the hairdryer in a current working mode, the upper temperature limit value being adapted to trigger temperature protection of the hairdryer;

determining a temperature adjustment value corresponding to a temperature difference between the air inlet temperature and the standard temperature; and adjusting the upper temperature limit value corresponding to the standard temperature according to the temperature adjustment value so as to obtain the upper temperature limit value corresponding to the air inlet temperature.

In a possible embodiment, determining the temperature adjustment value corresponding to the temperature difference between the air inlet temperature and the standard temperature, includes:

obtaining device information of the hairdryer;

determining a temperature adjustment relationship corresponding to the device information, the temperature adjustment relationship at least including a corresponding relationship between the temperature difference and the temperature adjustment value; and determining the temperature adjustment value based on the temperature difference and the temperature adjustment relationship.

In a possible embodiment, the device information includes a model of the hairdryer and/or a model of the heating device.

In a possible embodiment, obtaining the upper temperature limit value corresponding to the standard temperature of the hairdryer in the current working mode, includes:

obtaining a temperature corresponding relationship between a working range and the upper temperature limit value; and determining the upper temperature limit value corresponding to the standard temperature based on the working range and the temperature corresponding relationship.

In a possible embodiment, the method further includes:

performing temperature protection of the hairdryer according to the upper temperature limit value corresponding to the air inlet temperature, within a preset duration after the hairdryer is switched to the current working mode.

In a possible embodiment, a value of the preset duration is determined based on a duration when an air outlet temperature of an air outlet channel of the hairdryer reaches a stable level after the hairdryer is switched to the current working mode.

In a possible embodiment, performing the temperature protection of the hairdryer according to the upper temperature limit value corresponding to the air inlet temperature, includes:

controlling the hairdryer to stop working, when an air outlet temperature of an air outlet channel of the hairdryer is greater than or equal to the upper temperature limit value corresponding to the air inlet temperature.

An embodiment of the present disclosure provides a hairdryer control device, wherein a temperature sensor is disposed in an air inlet channel of a hairdryer. The hairdryer control device includes:

a temperature acquisition module, the temperature acquisition module being adapted to obtain an air inlet temperature collected by the temperature sensor in the air inlet channel;

an upper limit value acquisition module, the upper limit value acquisition module being adapted to obtain an upper temperature limit value corresponding to a standard temperature of the hairdryer in a current working mode, the upper temperature limit value being adapted to trigger temperature protection of the hairdryer;

an adjustment value determination module, the adjustment value determination module being adapted to determine a temperature adjustment value corresponding to a temperature difference between the air inlet temperature and the standard temperature; and an upper limit value adjustment module, the upper limit value adjustment module being adapted to adjust the upper temperature limit value corresponding to the standard temperature according to the temperature adjustment value so as to obtain the upper temperature limit value corresponding to the air inlet temperature.

An embodiment of the present disclosure provides a hairdryer control device. The device includes a processor and a memory having a program stored in the memory; wherein the program is loaded and executed by the processor to implement the hairdryer control method according to a first aspect.

An embodiment of the present disclosure provides a computer-readable storage medium. The storage medium includes a program stored in the computer-readable storage medium; wherein when executed by a processor, the program is adapted to implement the above hairdryer control method according to the first aspect.

The hairdryer control method, the device and the storage medium provided by the embodiments of the present disclosure can solve the problem that the hairdryer may be stopped by mistake by using a fixed upper temperature limit value for temperature protection control in high-temperature environments by: obtaining the air inlet temperature collected by the temperature sensor which is additionally set in the air inlet channel of the hairdryer; obtaining the upper temperature limit value corresponding to the standard temperature of the hairdryer in the current working mode, wherein the upper temperature limit value is adapted to trigger the temperature protection of the hairdryer; determining the temperature adjustment value corresponding to the temperature difference between the inlet air temperature and the standard temperature; and adjusting the upper temperature limit value corresponding to the standard temperature according to the temperature adjustment value so as to obtain the upper temperature limit value corresponding to the inlet air temperature. Since the corresponding upper temperature limit value can be adjusted under high-temperature environment, using the adjusted upper temperature limit value for temperature protection control can reduce the probability of stopping the hairdryer by mistake and improve the accuracy of temperature protection control.

The above description is only an overview of technical schemes of the present disclosure. In order to better understand the technical means of the present disclosure and implement them in accordance with the contents of the description, the embodiments of the present disclosure and the accompanying drawings are described in detail below.

DETAILED DESCRIPTION

Specific embodiments of the present disclosure will be described in further detail below in combination with accompanying drawings and implementation examples. The following embodiments are adapted to illustrate the present disclosure, but are not adapted to limit the scope of the present disclosure.

In related technologies, a motor control application of high-speed hairdryer usually includes a large filter capacitor. When the power supply is turned off, the filter capacitor will also store part of the power, which can be used for the micro controller unit (MCU) to work for a period of time. In the application of high-speed motor of related technologies, generally, the MCU will be stopped working when the power is cut off, and all operations will be executed in the state of power on. However, if the operation such as flash writing is executed while the motor is running, it may interfere with the high-speed timing of motor drive, thereby resulting in some errors.

Firstly, some terminologies involved in the present disclosure will be explained.

A filter capacitor is an energy storage device installed at both ends of a rectifier circuit in order to reduce AC ripple coefficient, and improve efficiency and smooth DC output. Because of the filter circuit, it requires a large capacitance of the energy storage capacitor.

A micro controller unit (MCU), also known as a single chip microcomputer, is a chip-level computer which appropriately reduces the frequency and specification of a central process unit (CPU), and integrates a memory, a timer, a USB, a A/D conversion, a universal asynchronous receiver/transmitter (UART), a programmable logic controller (PLC), a direct memory access (DMA) and other peripheral interfaces, and even a liquid crystal display (LCD) driver circuit on a single chip to form a chip level computer, for executing different combined control for different applications.

Figure 1:
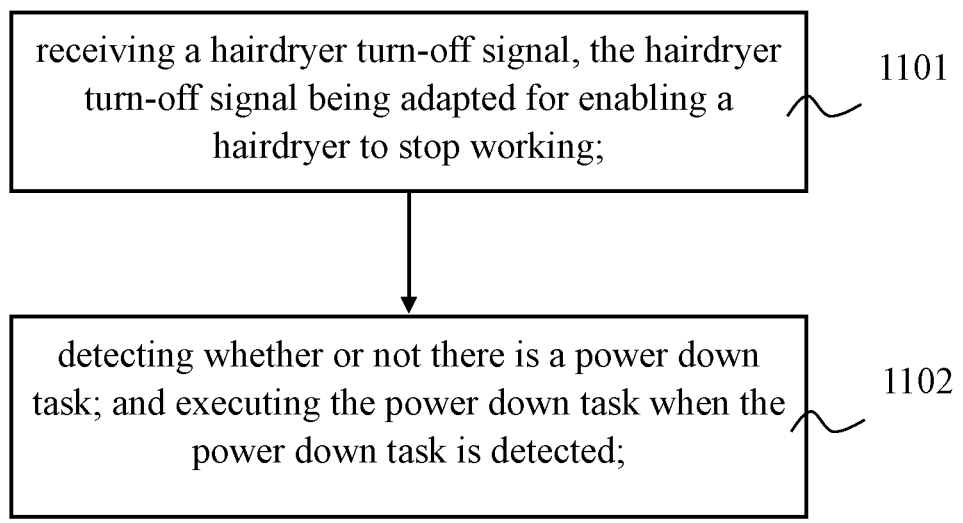
FIG. 1 is a hairdryer control method provided by an embodiment of the present disclosure.

FIG. 1 is a hairdryer control method provided by an embodiment of the present disclosure, which is applicable to a device with a high-speed motor. In a high-speed motor control application, it usually includes a large filter capacitor. After the device is turned off, part of the power will be stored in the filter capacitor for MCU to continue working for a period of time. The hairdryer control method includes at least the following steps:

step 1101, receiving a hairdryer turn-off signal which is adapted for enabling the hairdryer to stop working; and step 1102, detecting whether or not there is a power down task, and executing the power down task when the power down task is detected.

The power down task is a task which cannot be executed when the hairdryer is turned on. If this task is executed when the hairdryer is turned on, it will cause interference to the high-speed timing of motor drive, and then lead to some wrong results. In this embodiment, the power down task includes one or more of a braking task, a flash writing task and others. For example, the flash writing process needs to turn off all interrupts of other components. If an error occurs in this process, it may cause the high-speed motor to run disorderly, and even cause the flash writing operation to overwrite the normal ROM program body, resulting in unpredictable results. In other embodiments, the power down task can also include others, which is not specifically limited here and depends on the actual situation.

In a possible embodiment, the power down task is stored in a power down file in a form of queue lines, so that after one power down task is executed, a next power down task can be executed. In other embodiments, the power down task can also be stored in the power down task in other forms, depending on actual situations which will not be specifically limited here.

In a possible embodiment, the method further includes a step of:

obtaining a current duration which is a duration from receiving the hairdryer turn-off signal to the current time.

When the current duration is greater than a preset duration, the power down task is stopped. When the hairdryer turn-off signal is received for a period of time, and the duration of this period is greater than the preset duration, remaining power down tasks will be stopped. Specifically, the preset duration is a duration from the beginning of discharge of the filter capacitor to the end of discharge.

In summary, by receiving the hairdryer turn-off signal which is adapted to stop the hairdryer; then, detecting whether or not there is a power down task, and executing the power down task when the power down task is detected; some tasks are avoided to affect the driving process of the hairdryer because they are executed when the hairdryer is turned on. By making rational use of the electric energy stored in the filter capacitor, some power loss tasks are executed after the hairdryer is turned off and before the discharge of the filter capacitor is completed, so as to reduce the impact of power loss tasks on the motor driving process.

Figure 2:
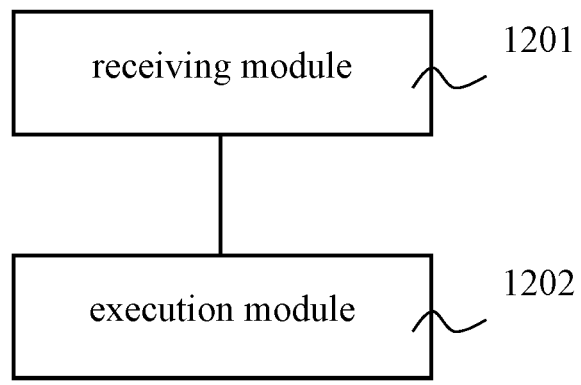
FIG. 2 is a hairdryer control device provided by an embodiment of the present disclosure.

FIG. 2 is a hairdryer control device provided by an embodiment of the present disclosure. The hairdryer control device includes at least:

a receiving module 1201 for receiving a hairdryer turn-off signal which is adapted for enabling the hairdryer to stop working; and an execution module 1202 which is adapted to detect whether or not there is a power down task, and execute the power down task when the power down task is detected.

Relevant details can be referred to the above method embodiment.

It should be noted that when the hairdryer control device provided in the above embodiment controls the hairdryer, only the division of the above functional modules is illustrated. In practical applications, the above functions can be allocated by different functional modules according to needs. That is, the internal structure of the hairdryer control device is divided into different functional modules to complete all or part of the functions described above. In addition, the hairdryer control device provided by the above embodiment belongs to the same concept as the hairdryer control method embodiment. The specific implementation process of the hairdryer control device can be referred to the method embodiment in detail, which will not be repeated here.

Figure 3:
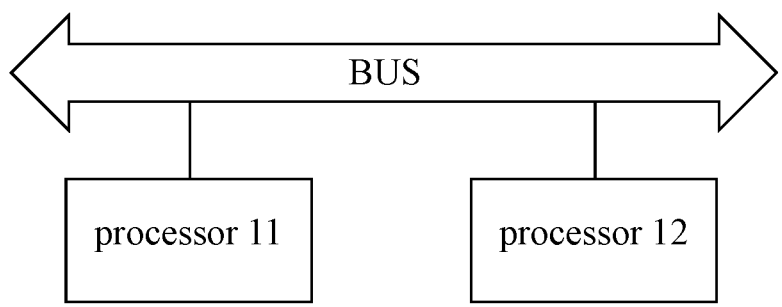
FIG. 3 is a hairdryer control device provided by another embodiment of the present disclosure.

FIG. 3 is a hairdryer control device provided by another embodiment of the present disclosure. The hairdryer control device includes at least a processor 11 and a memory 12.

The processor 11 may include one or more processing cores, such as a 4-core processor, an 8-core processor, etc. The processor can be implemented in at least one hardware form of DSP (Digital Signal Processing), FPGA (Field-Programmable Gate Array) and PLA (Programmable Logic Array). The processor 11 may also include a main processor and a coprocessor. The main processor is a processor adapted to process data in a wake-up state, which is also known as a CPU (Central Processing Unit). The coprocessor is a low-power processor for processing data in a standby mode.

The memory 12 may include one or more computer-readable storage media. The computer-readable storage medium may be non-transient. The memory 12 may also include a high-speed random access memory and a nonvolatile memory, such as one or more disk storage devices and flash storage devices. In some embodiments, a non-transient computer-readable storage medium in the memory 12 is adapted to store at least one instruction. The at least one instruction is executed by the processor 11 to implement the hairdryer control method provided by the method embodiment of the present disclosure.

In some embodiments, the hairdryer control device also optionally includes a peripheral interface and at least one peripheral device. The processor 11, the memory 12 and the peripheral device interface can be connected through a BUS or a signal line. Each peripheral device can be connected with the peripheral device interface through a BUS, a signal line or a circuit board. Schematically, the peripheral devices include but are not limited to a RF circuit, a touch screen, an audio circuit, and a power supply, etc.

Of course, the hairdryer control device may also include fewer or more components, which is not limited in the present embodiment.

In a possible embodiment the present disclosure also provides a computer-readable storage medium having a program stored in the computer-readable storage medium. The program is loaded and executed by the processor to implement the hairdryer control method of the above method embodiment.

In a possible embodiment, the present disclosure also provides a computer product. The computer product includes a computer-readable storage medium having a program stored in the computer-readable storage medium. The program is loaded and executed by the processor to implement the hairdryer control method of the above method embodiment.

The technical features of the above embodiments can be combined arbitrarily. In order to simplify the description, all possible combinations of each technical feature in the above embodiment are not described. However, as long as there is no contradiction in the combination of these technical features, they should be considered to be the scope recorded in this specification.

In related technologies, in order to realize the functions of constant temperature output and temperature protection of the hairdryer, the most important thing is the stability of the external temperature value obtained by the temperature sensor. If the temperature value obtained is unstable, it will not be beneficial to constant temperature control, and it is easy to trigger temperature protection by mistake. The hairdryers of related technologies basically use a simple algorithm to filter out some external interference. However, these methods cannot detect whether the temperature is stable or not at the moment.

Firstly, several terminologies related to the embodiments of the present disclosure are introduced as follows.

An analog to digital converter (ADC) is an electronic component which converts analog signals into digital signals.

The hairdryer control method disclosed in the embodiments of the present disclosure is specifically applied to the control of a heating device. The control method of the heating device can also be applied to the control of heating devices such as heaters. The embodiment of the present disclosure does not specifically limit the application of the control of the heating device.

Figure 4:
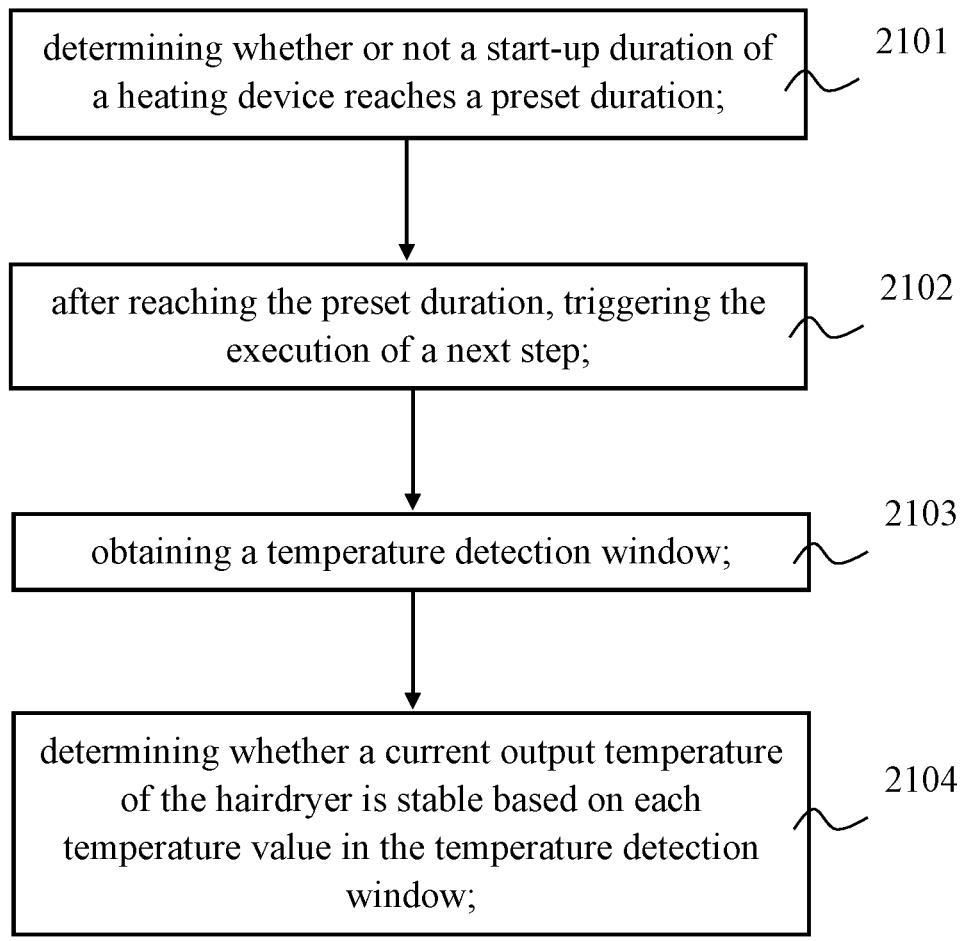
FIG. 4 is a flowchart of a hairdryer control method provided by an embodiment of the present disclosure.

FIG. 4 is a flowchart of a hairdryer control method provided by an embodiment of the present disclosure. The hairdryer control method is used for determining the temperature of the hairdryer. The method includes at least the following step:

step 2103, obtaining a temperature detection window which is adapted to collect temperature values within a preset window duration determined based on a current detection time.

In a possible embodiment, obtaining the temperature detection window includes:

determining the current detection time as an upper limit value of the temperature detection window, and determining the time corresponding to the preset window duration before the current detection time as a lower limit value of the temperature detection window, thereby obtaining the temperature detection window.

In a possible embodiment, obtaining the temperature detection window includes: determining the current detection time as a lower limit value of the temperature detection window, and determining the time corresponding to the preset window duration after the current detection time as an upper limit value of the temperature detection window, thereby obtaining the temperature detection window.

step 2104, determining whether the current output temperature of the hairdryer is stable or not based on each temperature value in the temperature detection window.

In a possible embodiment, determining whether the current output temperature of the hairdryer is stable or not based on each temperature value in the temperature detection window, includes:

obtaining a maximum temperature value and a minimum temperature value in the temperature detection window;

calculating a difference between the maximum temperature value and the minimum temperature value;

determining that the current output temperature of the hairdryer is unstable and sending a prompt signal, when the difference is less than a preset desired temperature threshold; and determining that the current output temperature of the hairdryer is stable, when the difference is greater than the preset desired temperature threshold.

In a possible embodiment, determining whether the current output temperature of the hairdryer is stable or not based on each temperature value in the temperature detection window, includes:

obtaining an average temperature value in the temperature detection window;

determining that the current output temperature of the hairdryer is unstable and sending a prompt signal, when the average temperature value is greater than a preset desired temperature threshold; and determining that the current output temperature of the hairdryer is stable, when the average temperature value is less than the preset desired temperature threshold.

In a possible embodiment, the temperature threshold is determined based on the average temperature of the corresponding temperature detection window at the previous time.

In a possible embodiment, the hairdryer control method further includes:

step 2101, determining whether or not a start-up duration of the heating device reaches the preset duration; and step 2102, triggering the execution of step 2103 (that is, the step of obtaining the temperature detection window), when the start-up duration of the heating device reaches the preset duration.

In summary, the hairdryer control method provided in this embodiment can accurately monitor temperature changes and capture the sudden changes in temperature, by obtaining the temperature detection window to collect the temperature values within the preset window duration determined based on the current detection time; and determining whether the current output temperature of the hairdryer is stable or not based on each temperature value in the temperature detection window.

The heating device can be a heating wire, etc., which is not specifically limited here and depends on the actual situation. A fixed power of the heating device depends on its actual situation and is not specifically limited here.

Figure 5:
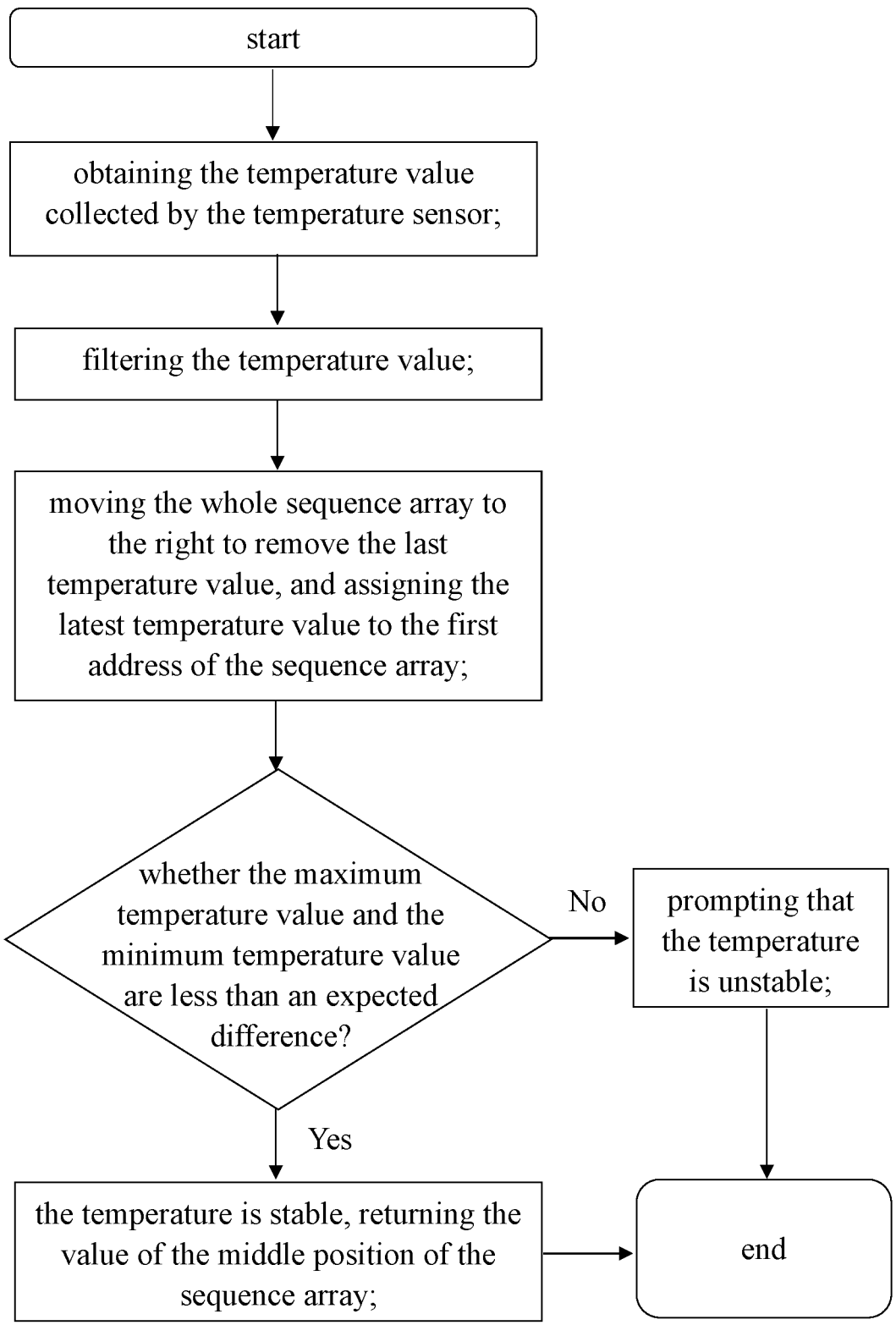
FIG. 5 is a specific flow chart of a hairdryer control method provided by an embodiment of the present disclosure.

Referring to FIG. 5, it is described in detail in a specific embodiment.

Specific steps of the hairdryer control method are as follows:

obtaining the temperature values collected by the temperature sensor within the preset window duration. The preset window duration is set according to the cycle to be collected and the working parameters of the heating device. The setting method is a conventional method for those skilled in the art. The temperature values collected by the temperature sensor complete analog-to-digital conversion through an ADC (analog-to-digital converter) sampling circuit; and filtering the temperature values to reduce the impact of the outside world and hardware circuit. In this embodiment, the filtering process is realized by using the filtering algorithm commonly used in the prior art (such as amplitude limiting filtering method). The filtered temperature values form a temperature detection window. In this embodiment, in order to make the judgment more accurate, the method of obtaining the temperature detection window includes: determining the current detection time as the lower limit value of the temperature detection window, and determining the time corresponding to the preset window duration after the current detection time as the upper limit value of the temperature detection window, thereby obtaining the temperature detection window. In detail, each temperature value after filtering is used as a sequence array, the whole sequence array is moved to the right to remove the last temperature value, and the latest temperature value is assigned to the first address of the sequence array to form a new sequence array. The new sequence array is the temperature detection window. The first digit of the last temperature value is the lower limit value of the temperature detection window, and the latest temperature value is the upper limit value of the temperature window. Then, the maximum temperature value and the minimum temperature value in the new sequence array are obtained, the difference between the maximum temperature value and the minimum temperature value is calculated, and whether or not the difference is less than the expected difference is determined. If the difference is less than the expected difference, it is determined that the temperature is stable and the value in the middle of the sequence array is returned. If the difference is greater than the expected difference, it indicates that the temperature is unstable.

It should be noted that the above steps are executed after the hairdryer is started. Specifically, after the hairdryer is started, it is determined whether the starting time of the heating device reaches the preset duration. When the starting time of the heating device reaches the preset duration, the temperature sensor is triggered. The preset duration can be set according to factors such as the hairdryer temperature and the starting time. As in this embodiment, the preset duration is 20 s, and the temperature sensor is triggered 20 s after the hairdryer is started.

Figure 6:
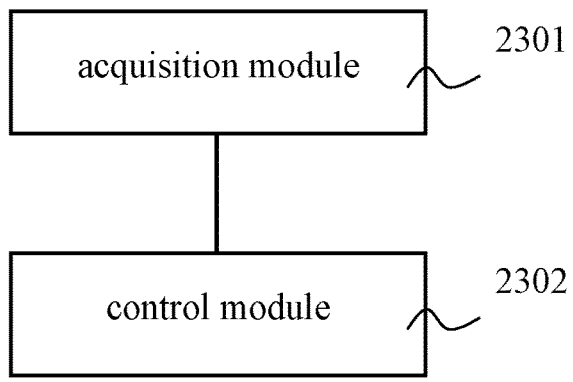
FIG. 6 is a block diagram of a hairdryer control device provided by an embodiment of the present disclosure.

FIG. 6 is a block diagram of a hairdryer control device provided by an embodiment of the present disclosure. The hairdryer control device includes at least the following modules:

an acquisition module 2301 for obtaining a temperature detection window. The temperature detection window is adapted to collect temperature values within a preset window duration determined based on the current detection time; and a control module 2302 which adapted to determine whether the current output temperature of the hairdryer is stable or not based on each temperature value in the temperature detection window.

Relevant details can be referred to the above method embodiment.

It should be noted that when the hairdryer control device provided in the above embodiment controls the hairdryer, only the division of the above functional modules is illustrated. In practical applications, the above functions can be allocated by different functional modules according to needs. That is, the internal structure of the temperature detection and correction device is divided into different functional modules to complete all or part of the functions described above. In addition, the temperature detection and correction device provided in the above embodiment belongs to the same concept as the embodiment of the hairdryer control method. The specific implementation process of the hairdryer control device can be referred to the method embodiment in detail, which will not be repeated here.

Figure 7:
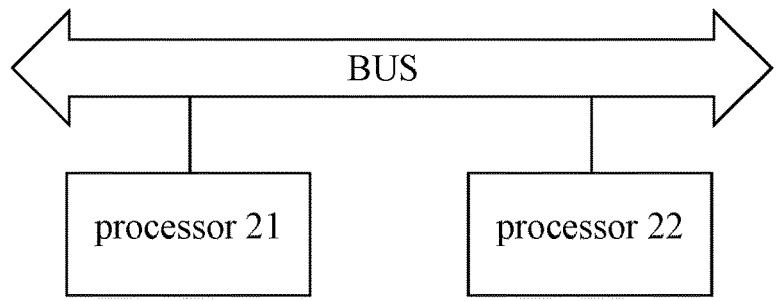
FIG. 7 is a block diagram of a hairdryer control device provided by another embodiment of the present disclosure.

FIG. 7 is a block diagram of a hairdryer control device provided by an embodiment of the present disclosure. The hairdryer control device includes at least a processor 21 and a memory 22.

The processor 21 may include one or more processing cores, such as a 4-core processor, an 8-core processor, etc. The processor 21 can be implemented in at least one hardware form of DSP (Digital Signal Processing), FPGA (Field-Programmable Gate Array) and PLA (Programmable Logic Array). The processor 21 may also include a main processor and a coprocessor. The main processor is a processor adapted to process data in a wake-up state, which is also known as a CPU (Central Processing Unit). The coprocessor is a low-power processor for processing data in a standby mode.

The memory 22 may include one or more computer-readable storage media. The computer-readable storage medium may be non-transient. The memory 22 may also include a high-speed random access memory and a nonvolatile memory, such as one or more disk storage devices and flash storage devices. In some embodiments, a non-transient computer-readable storage medium in the memory 22 is adapted to store at least one instruction. The at least one instruction is executed by the processor 21 to implement the hairdryer control method provided by the method embodiment of the present disclosure.

In some embodiments, the hairdryer control device also optionally includes a peripheral interface and at least one peripheral device. The processor 21, the memory 22 and the peripheral device interface can be connected through a BUS or a signal line. Each peripheral device can be connected with the peripheral device interface through a BUS, a signal line or a circuit board. Schematically, the peripheral devices include but are not limited to a RF circuit, a touch screen, an audio circuit, and a power supply, etc.

Of course, the hairdryer control device may also include fewer or more components, which is not limited in the present embodiment.

In a possible embodiment the present disclosure also provides a computer-readable storage medium having a program stored in the computer-readable storage medium.

The program is loaded and executed by the processor to implement the hairdryer control method of the above method embodiment.

In a possible embodiment, the present disclosure also provides a computer product. The computer product includes a computer-readable storage medium having a program stored in the computer-readable storage medium. The program is loaded and executed by the processor to implement the hairdryer control method of the above method embodiment.

The technical features of the above embodiments can be combined arbitrarily. In order to simplify the description, all possible combinations of each technical feature in the above embodiment are not described. However, as long as there is no contradiction in the combination of these technical features, they should be considered to be the scope recorded in this specification.

In related technologies, it is necessary to detect the power supply voltage during the operation of the hairdryer to detect whether the hairdryer works within the normal voltage range. If the heating device is turned on during detection, it will interfere with the detection voltage and make the detection data deviate. This will cause deviation to the later power control and temperature control, and even the problem of false triggering of voltage protection.

Firstly, some terminology involved in the present disclosure is introduced as follows:

An analog to digital converter (ADC) is an electronic component which converts analog signals into digital signals.

The hairdryer control method disclosed in the embodiments of the present disclosure is specifically applied to the control of a heating device. The control method of the heating device can also be applied to the control of heating devices such as heaters. The embodiment of the present disclosure does not specifically limit the application of the control of the heating device.

Figure 8:
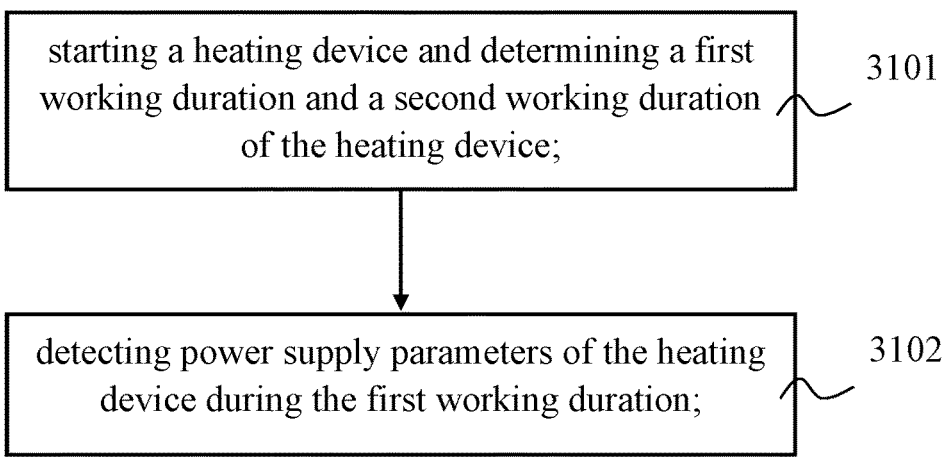
FIG. 8 is a flowchart of a hairdryer control method provided by an embodiment of the present disclosure.

FIG. 8 is a flowchart of a hairdryer control method provided by an embodiment of the present disclosure. The hairdryer control method is used for determining the temperature of the hairdryer. The method comprises at least the following steps:

step 3101, determining a first working duration and a second working duration of a heating device, when the heating device is started;

In a possible embodiment, after the heating device is started, the first working duration and the second working duration form a cycle.

In a possible embodiment, the first operating time is a time when the heating device is in a non-working state.

In a possible embodiment, the calculation method of the first working duration is a duration from an end of a last second working duration and a delay of a preset duration to a beginning of a next second working duration is determined as the first working duration.

In a possible embodiment, the second working duration is a time when the heating device is in a working state.

step 3102, detecting power supply parameters of the heating device during the first working duration.

In a possible embodiment, detecting power supply parameters of the heating device during the first working duration includes: obtaining and detecting the power supply voltage of the heating device during the first working duration.

In a possible embodiment, detecting power supply parameters of the heating device during the first working duration includes: obtaining and detecting the power supply current of the heating device during the first working duration.

In summary, the hairdryer control method provided in this embodiment solves the interference caused by the operation of the heating device to the detection of power parameters by determining the first working duration and the second working duration of the heating device after the heating device is started; and detecting the power supply parameters of the heating device during the first working duration.

The heating device can be a heating wire, etc., which is not specifically limited here and depends on the actual situation. A fixed power of the heating device depends on its actual situation and is not specifically limited here.

Figure 9:
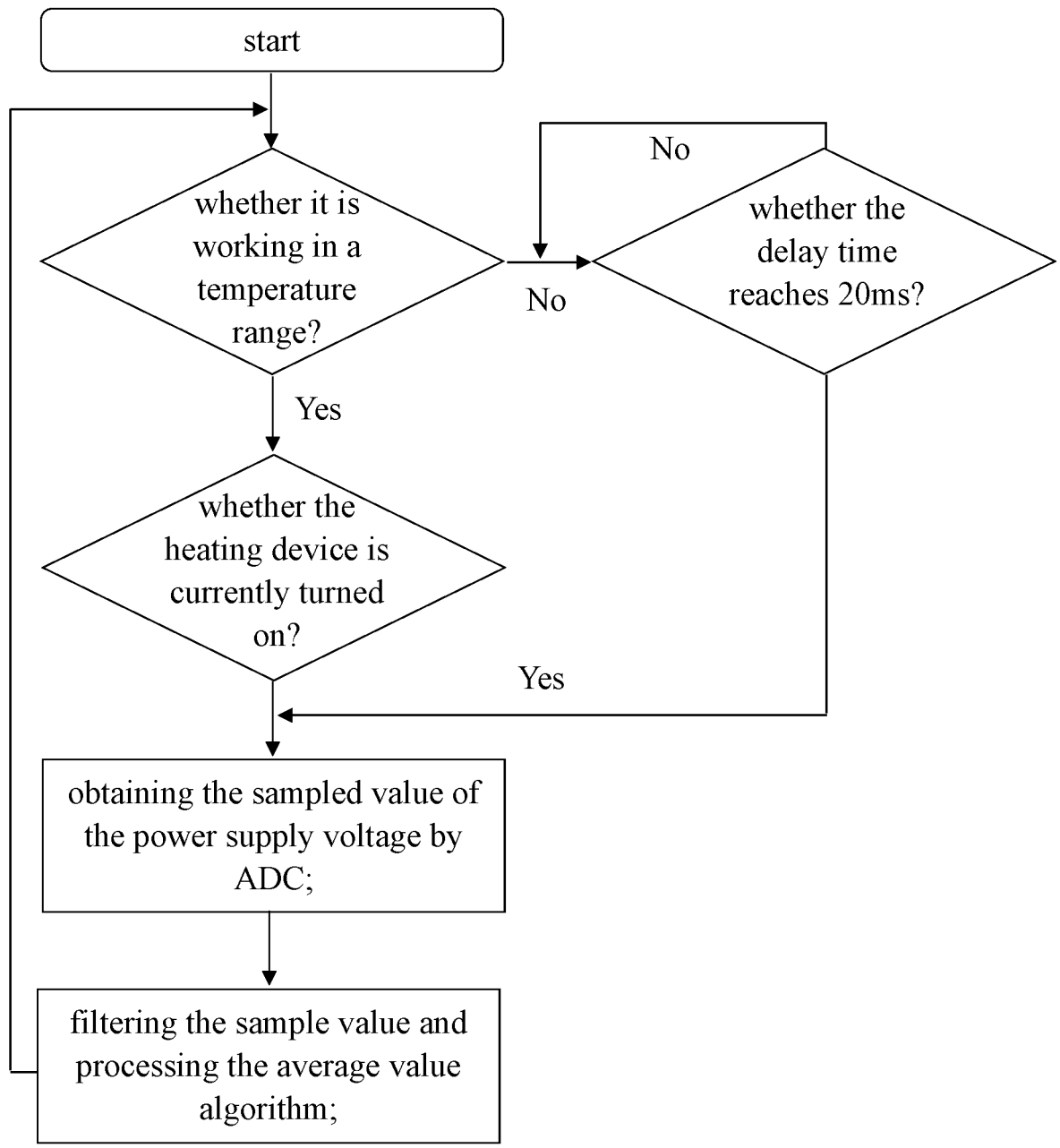
FIG. 9 is a specific flow chart of a hairdryer control method provided by an embodiment of the present disclosure.

Referring to FIG. 9, it is described in detail in a specific embodiment.

Specific steps of the hairdryer control method are as follows:

determining whether the heating device works in the working range. The working range includes a cold air range and a temperature range. When the heating device works in the cold air range, its working duration can be called the first working duration. When the heating device works in the temperature range, its working duration can be called the second working duration.

determining whether the heating device is currently turned on if the heating device works in the temperature range. After the heating device is turned on, the heating device will work intermittently. Similarly, when the heating device does not work, its working duration is also called the first working duration. When the heating device works, its working duration is also called the second working duration. It should be noted that after the heating device is started, the first working duration and the second working duration form a complete cycle. The first working duration and the second working duration are half waves of one cycle, respectively. If the heating device does not work in the temperature range, it is determined whether the delay time reaches the preset duration; if yes, proceed to the next step. The preset duration is the time when the heating device needs to be turned on. In this embodiment, the preset duration is set to 20 s;

obtaining a sampling value of the power supply voltage through ACD when the heating device is in the first working duration; and filtering and processing the sampling value of the power supply voltage by means of algorithm. The problem of external and hardware interference during power supply voltage sampling can be eliminated by filtering. After completing the filtering process, return to re-determine whether it works in the temperature range to repeat the above steps.

The hairdryer control method completes the detection of the power supply voltage when the heating device is not working (within the first working duration), which is equivalent to leaving a half wave in the working cycle of the heating device to detect the power supply voltage.

Figure 10:
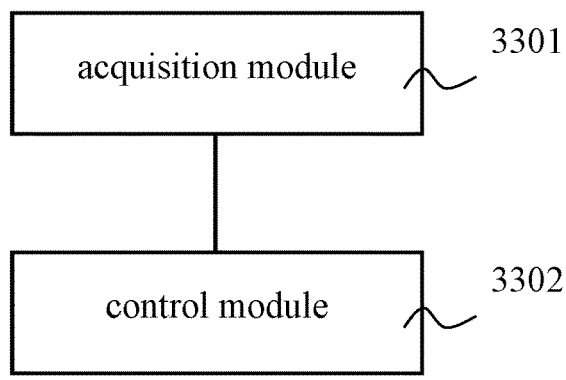
FIG. 10 is a block diagram of a hairdryer control device provided by an embodiment of the present disclosure.

FIG. 10 is a block diagram of a hairdryer control device provided by an embodiment of the present disclosure. The hairdryer control device includes at least the following modules:

a determination module 3301 which is adapted to determine a first working duration and a second working duration of the heating device after the heating device is started. The first working duration is the working duration of the heating device.

a detection module 3302 for detecting the power supply parameters of the heating device during the first working duration.

Relevant details can be referred to the above method embodiment.

It should be noted that when the hairdryer control device provided in the above embodiment controls the hairdryer, only the division of the above functional modules is illustrated. In practical applications, the above functions can be allocated by different functional modules according to needs. That is, the internal structure of the hairdryer control device is divided into different functional modules to complete all or part of the functions described above. In addition, the hairdryer control device provided by the above embodiment belongs to the same concept as the hairdryer control method embodiment. The specific implementation process of the hairdryer control device can be referred to the method embodiment in detail, which will not be repeated here.

Figure 11:
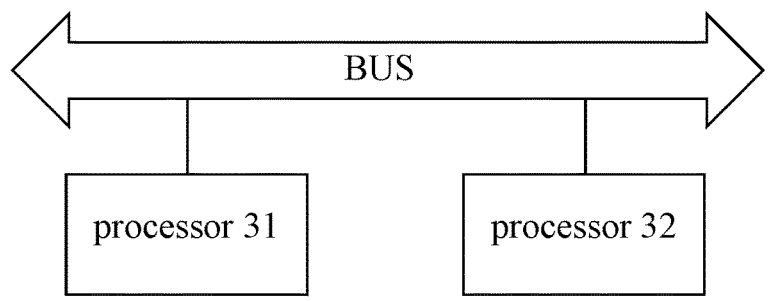
FIG. 11 is a block diagram of a hairdryer control device provided by another embodiment of the present disclosure.

FIG. 11 is a block diagram of a hairdryer control device provided by an embodiment of the present disclosure. The hairdryer control device includes at least a processor 31 and a memory 32.

The processor 31 may include one or more processing cores, such as a 4-core processor, an 8-core processor, etc. The processor 31 can be implemented in at least one hardware form of DSP (Digital Signal Processing), FPGA (Field-Programmable Gate Array) and PLA (Programmable Logic Array). The processor 31 may also include a main processor and a coprocessor. The main processor is a processor adapted to process data in a wake-up state, which is also known as a CPU (Central Processing Unit). The coprocessor is a low-power processor for processing data in a standby mode.

The memory 32 may include one or more computer-readable storage media. The computer-readable storage medium may be non-transient. The memory 32 may also include a high-speed random access memory and a nonvolatile memory, such as one or more disk storage devices and flash storage devices. In some embodiments, a non-transient computer-readable storage medium in the memory 32 is adapted to store at least one instruction. The at least one instruction is executed by the processor 32 to implement the temperature detection and correction method provided by the method embodiment of the present disclosure.

In some embodiments, the hairdryer control device also optionally includes a peripheral interface and at least one peripheral device. The processor 31, the memory 32 and the peripheral device interface can be connected through a BUS or a signal line. Each peripheral device can be connected with the peripheral device interface through a BUS, a signal line or a circuit board. Schematically, the peripheral devices include but are not limited to a RF circuit, a touch screen, an audio circuit, and a power supply, etc.

Of course, the hairdryer control device may also include fewer or more components, which is not limited in the present embodiment.

In a possible embodiment the present disclosure also provides a computer-readable storage medium having a program stored in the computer-readable storage medium. The program is loaded and executed by the processor to implement the hairdryer control method of the above method embodiment.

In a possible embodiment, the present disclosure also provides a computer product. The computer product includes a computer-readable storage medium having a program stored in the computer-readable storage medium. The program is loaded and executed by the processor to implement the hairdryer control method of the above method embodiment.

The technical features of the above embodiments can be combined arbitrarily. In order to simplify the description, all possible combinations of each technical feature in the above embodiment are not described. However, as long as there is no contradiction in the combination of these technical features, they should be considered to be the scope recorded in this specification.

In related technologies, air volume of each part of the air outlet is inconsistent due to the internal structure of the hairdryer in the working process. This will lead to the low accuracy of the temperature value detected by the internal temperature sensor, and if the detected temperature deviation is too large, it is easy to trigger temperature protection and other operations.

Firstly, some terminology involved in the present disclosure is introduced as follows:

An analog to digital converter (ADC) is an electronic component which converts analog signals into digital signals.

The hairdryer control method disclosed in the embodiments of the present disclosure is specifically applied to the control of a heating device. The control method of the heating device can also be applied to the control of heating devices such as heaters. The embodiment of the present disclosure does not specifically limit the application of the control of the heating device.

Figure 12:
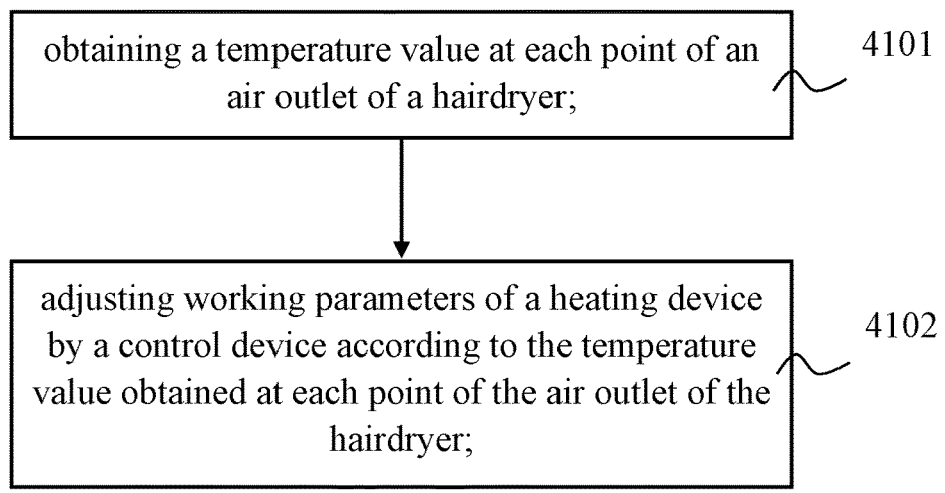
FIG. 12 is a flowchart of a hairdryer control method provided by an embodiment of the present disclosure.

FIG. 12 is a flowchart of a hairdryer control method provided by an embodiment of the present disclosure. The hairdryer control method is used for determining the temperature of the hairdryer. The method includes at least the following steps:

step 4101, obtaining a temperature value at each point of an air outlet of a hairdryer; and step 4102, adjusting working parameters of the heating device by a control device according to the temperature value obtained at each point of the air outlet of the hairdryer.

In a possible embodiment, adjusting working parameters of the heating device by a control device according to the temperature value obtained at each point of the air outlet of the hairdryer, includes:

calculating an average value of the temperature value at each point of the air outlet of the hairdryer;

calculating an expected adjustment parameter value of the heating device according to the average value and a temperature control function; and adjusting the working parameters of the heating device by the control device according to the expected adjustment parameter value.

In a possible embodiment, the hairdryer control method further includes: confirming test interval; and determining whether or not a detection time for a next detection of the temperature value at each point is reached, after the working parameters of the heating device are adjusted by the control device; if yes, triggering the step of "obtaining a temperature value at each point of an air outlet of a hairdryer".

In a possible embodiment, determining whether or not a detection time for a next detection of the temperature value at each point is reached, includes:

starting time calculation after the last adjustment of the working parameters of the heating device is completed; and determining whether the timing reaches the preset duration.

In a possible embodiment, the method further includes:
determining whether or not a start-up duration of the heating device reaches the preset duration; and
triggering the step of obtaining the temperature detection window, when the start-up duration of the heating device reaches the preset duration.

In summary, the control method of the hairdryer provided in this embodiment solves the error of the sampling temperature of the temperature sensor due to the inconsistency of the air outlet temperature of each part of the air outlet, by obtaining the temperature value of each point of the air outlet of the hairdryer; and adjusting the working parameters of the heating device by the controller according to the temperature value obtained at each point of the air outlet of the hairdryer.

The heating device can be a heating wire, etc., which is not specifically limited here and depends on the actual situation. A fixed power of the heating device depends on its actual situation and is not specifically limited here.

Figure 13:
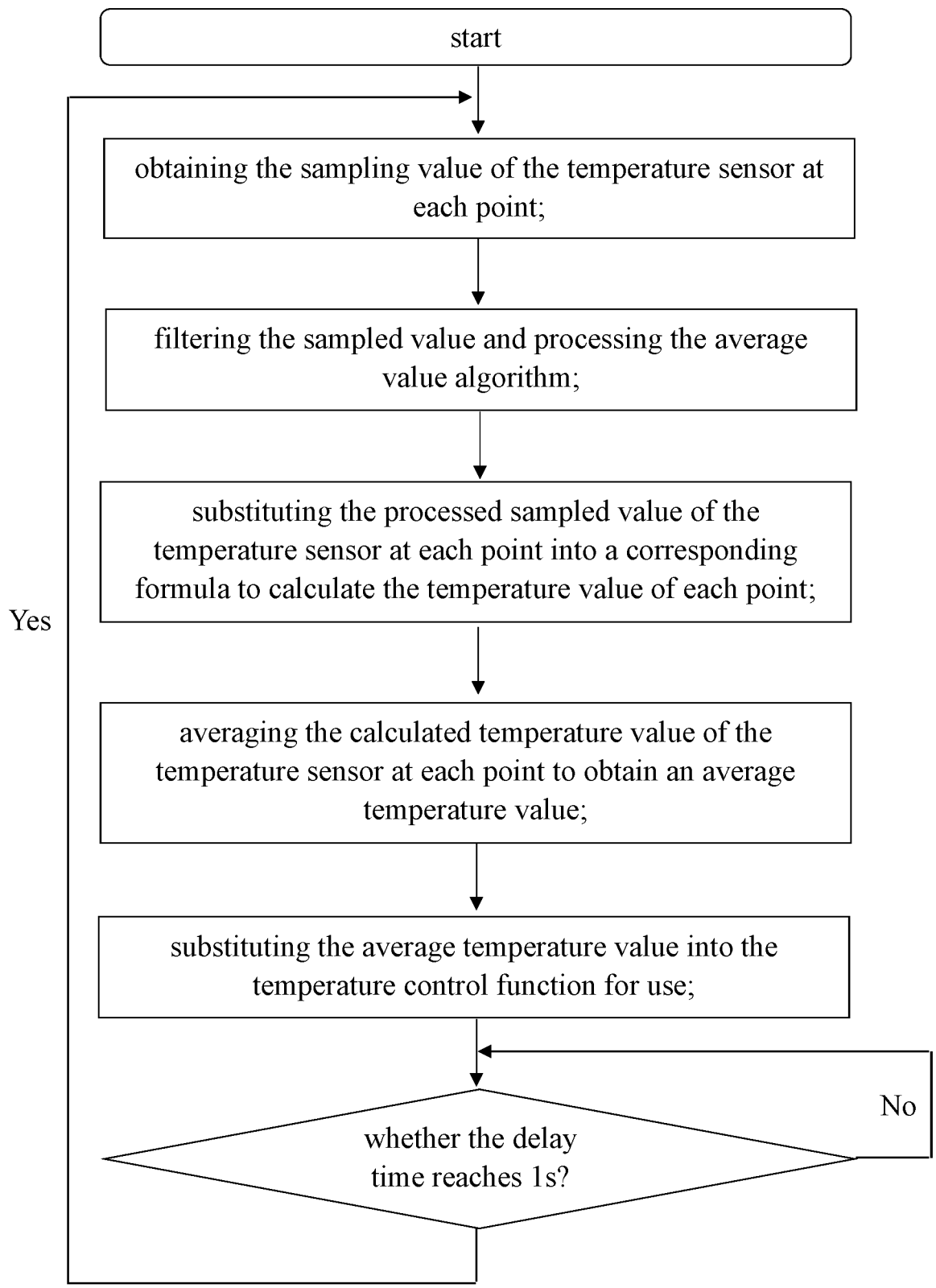
FIG. 13 is a specific flow chart of a hairdryer control method provided by an embodiment of the present disclosure.

Referring to FIG. 13, it is described in detail in a specific embodiment.

A hairdryer control method provided by an embodiment of the present disclosure including:
obtaining sampled value of each point at the air outlet of the hairdryer. A plurality of temperature sensors are arranged in the air outlet of the hairdryer. The sensors are arranged uniformly in a plurality of quadrants. The temperature sensor at each point collect the corresponding sampling value.
filtering and averaging the sampled values;
substituting the sampled value of each point temperature sensor after processing into the corresponding formula so as to calculate the temperature value of each point. The formula is a commonly used temperature calculation formula in the prior art, which will not be explained in detail here.
taking the calculated temperature value of each point temperature sensor as an average temperature value;
substituting the average temperature value into the temperature control function to adjust the working parameters of the heating device. In this step, the operation is realized through a control device, and the working parameters of the heating device are adjusted by the control device.
determining whether the delay time reaches the preset duration; If so, repeat the above steps. The preset duration is set to 1s in this embodiment. It should be noted that the detection time for determining whether to reach the temperature value of each point for the next detection includes the following steps: start timing after the last adjustment of heating device parameters is completed; and determining whether the timing reaches the preset duration.

Figure 14:
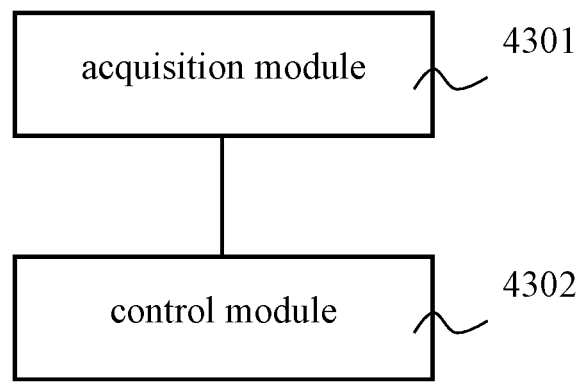
FIG. 14 is a block diagram of a hairdryer control device provided by an embodiment of the present disclosure.

FIG. 14 is a block diagram of a hairdryer control device provided by the embodiment of the present disclosure. The hairdryer control device includes at least the following modules:
an acquisition module 4301 adapted to obtain a temperature value at each point of an air outlet of a hairdryer; and
a control module 4302 for adjusting working parameters of a heating device according to the temperature value obtained at each point of the air outlet of the hairdryer.
Relevant details can be referred to the above method embodiment.

It should be noted that when the hairdryer control device provided in the above embodiment controls the hairdryer, only the division of the above functional modules is illustrated. In practical applications, the above functions can be allocated by different functional modules according to needs. That is, the internal structure of the hairdryer control device is divided into different functional modules to complete all or part of the functions described above. In addition, the hairdryer control device provided by the above embodiment belongs to the same concept as the hairdryer control method embodiment. The specific implementation process of the hairdryer control device can be referred to the method embodiment in detail, which will not be repeated here.

Figure 15:
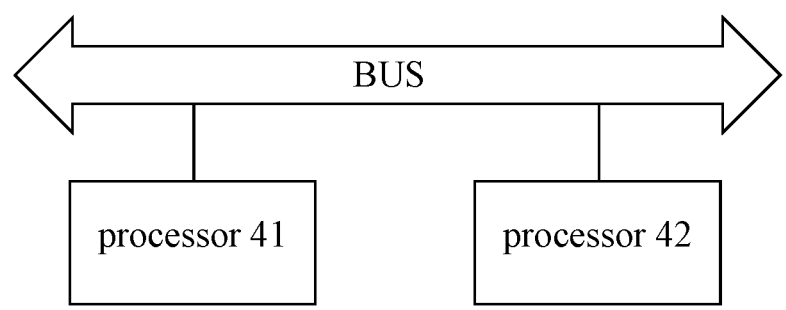
FIG. 15 is a block diagram of a hairdryer control device provided by another embodiment of the present disclosure.

FIG. 15 is a block diagram of a hairdryer control device provided by an embodiment of the present disclosure. The hairdryer control device includes at least a processor 41 and a memory 42.

The processor 41 may include one or more processing cores, such as a 4-core processor, an 8-core processor, etc. The processor 41 can be implemented in at least one hardware form of DSP (Digital Signal Processing), FPGA (Field-Programmable Gate Array) and PLA (Programmable Logic Array). The processor 41 may also include a main processor and a coprocessor. The main processor is a processor adapted to process data in a wake-up state, which is also known as a CPU (Central Processing Unit). The coprocessor is a low-power processor for processing data in a standby mode.

The memory 42 may include one or more computer-readable storage media. The computer-readable storage medium may be non-transient. The memory 42 may also include a high-speed random access memory and a nonvolatile memory, such as one or more disk storage devices and flash storage devices. In some embodiments, a non-transient computer-readable storage medium in the memory 42 is adapted to store at least one instruction. The at least one instruction is executed by the processor 41 to implement the hairdryer control method provided by the method embodiment of the present disclosure.

In some embodiments, the hairdryer control device also optionally includes a peripheral interface and at least one peripheral device. The processor 41, the memory 42 and the peripheral device interface can be connected through a BUS or a signal line. Each peripheral device can be connected with the peripheral device interface through a BUS, a signal line or a circuit board. Schematically, the peripheral devices include but are not limited to a RF circuit, a touch screen, an audio circuit, and a power supply, etc.

Of course, the hairdryer control device may also include fewer or more components, which is not limited in the present embodiment.

In a possible embodiment the present disclosure also provides a computer-readable storage medium having a program stored in the computer-readable storage medium. The program is loaded and executed by the processor to implement the hairdryer control method of the above method embodiment.

In a possible embodiment, the present disclosure also provides a computer product. The computer product includes a computer-readable storage medium having a program stored in the computer-readable storage medium. The program is loaded and executed by the processor to implement the hairdryer control method of the above method embodiment.

The technical features of the above embodiments can be combined arbitrarily. In order to simplify the description, all possible combinations of each technical feature in the above embodiment are not described. However, as long as there is no contradiction in the combination of these technical features, they should be considered to be the scope recorded in this specification.

In related technologies, in order to ensure the safety of the working process of the hairdryer, a control system of the hairdryer usually includes a temperature protection control. The temperature protection control refers to a protection mechanism to control the shutdown of the hairdryer when the outlet temperature of the hairdryer is higher than the upper temperature limit.

However, the working environment of hairdryers may be diverse. In high-temperature environments, the outlet temperature of the hairdryer may be higher than the upper temperature limit value corresponding to the standard temperature (i.e., 25° C.), and the hairdryer can still work normally. If the temperature protection control is executed at this time, the hairdryer may be shut down by mistake.

Figure 16:
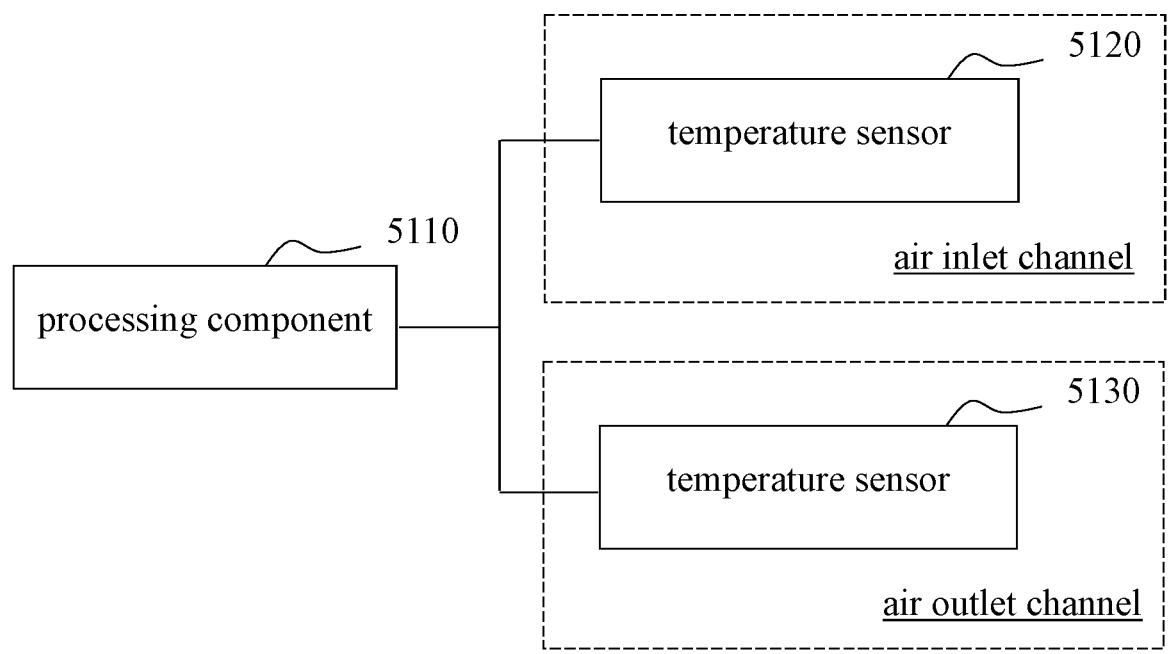
FIG. 16 is a structural diagram of a hairdryer control system provided by an embodiment of the present disclosure.

FIG. 16 is a structural diagram of a hairdryer provided by an embodiment of the present disclosure. As shown in FIG. 16, the hairdryer includes at least a processing component 5110, a temperature sensor 5120 arranged in an air inlet channel of the hairdryer, and a temperature sensor 5130 arranged in an air outlet channel of the hairdryer.

The type of temperature sensor 5120 and the type of temperature sensor 5130 are the same or different. For example, the temperature sensor 5120 and the temperature sensor 5130 are negative temperature coefficient (NTC) sensors.

Both the temperature sensor 5120 and the temperature sensor 5130 are connected in communication with the processing component 5110.

The temperature sensor 5120 is adapted to collect the air inlet temperature of the air inlet channel of the hairdryer; and send the inlet air temperature to the processing component 5110. The inlet air temperature is similar to the ambient temperature. Of course, in other embodiments, the temperature sensor 5120 may also be arranged on a housing of the hairdryer. The present embodiment does not limit the installation position of the temperature sensor 5120.

The temperature sensor 5130 is adapted to collect the air outlet temperature of the air outlet channel of the hairdryer; and send the outlet air temperature to the processing component 5110.

The number of temperature sensors 5120, 5130 may be one or more. The present embodiment does not limit the number of temperature sensors 5120, 5130.

In this embodiment, the processing component 5110 is adapted to obtain the inlet air temperature collected by the temperature sensor 5120; obtain the upper temperature limit value corresponding to the standard temperature of the hairdryer in the current working mode, and the upper temperature limit value is adapted to trigger the temperature protection of the hairdryer; determine the temperature adjustment value corresponding to the temperature difference between the inlet air temperature and the standard temperature; and adjust the upper temperature limit value corresponding to the standard temperature according to the temperature adjustment value so as to obtain the upper temperature limit value corresponding to the inlet air temperature.

After determining the upper temperature limit value corresponding to the inlet air temperature, the processing component 5110 executes temperature protection for the hairdryer according to the upper temperature limit value corresponding to the inlet air temperature. For example, when the outlet air temperature collected by the temperature sensor 5130 is greater than the upper temperature limit value corresponding to the inlet air temperature, the hairdryer is controlled to stop. In other embodiments, when the outlet air temperature collected by the temperature sensor 5130 is greater than the upper temperature limit value corresponding to the inlet air temperature, the processing component 5110 can also reduce the working power. This embodiment does not limit the execution mode of temperature protection.

Figure 17:
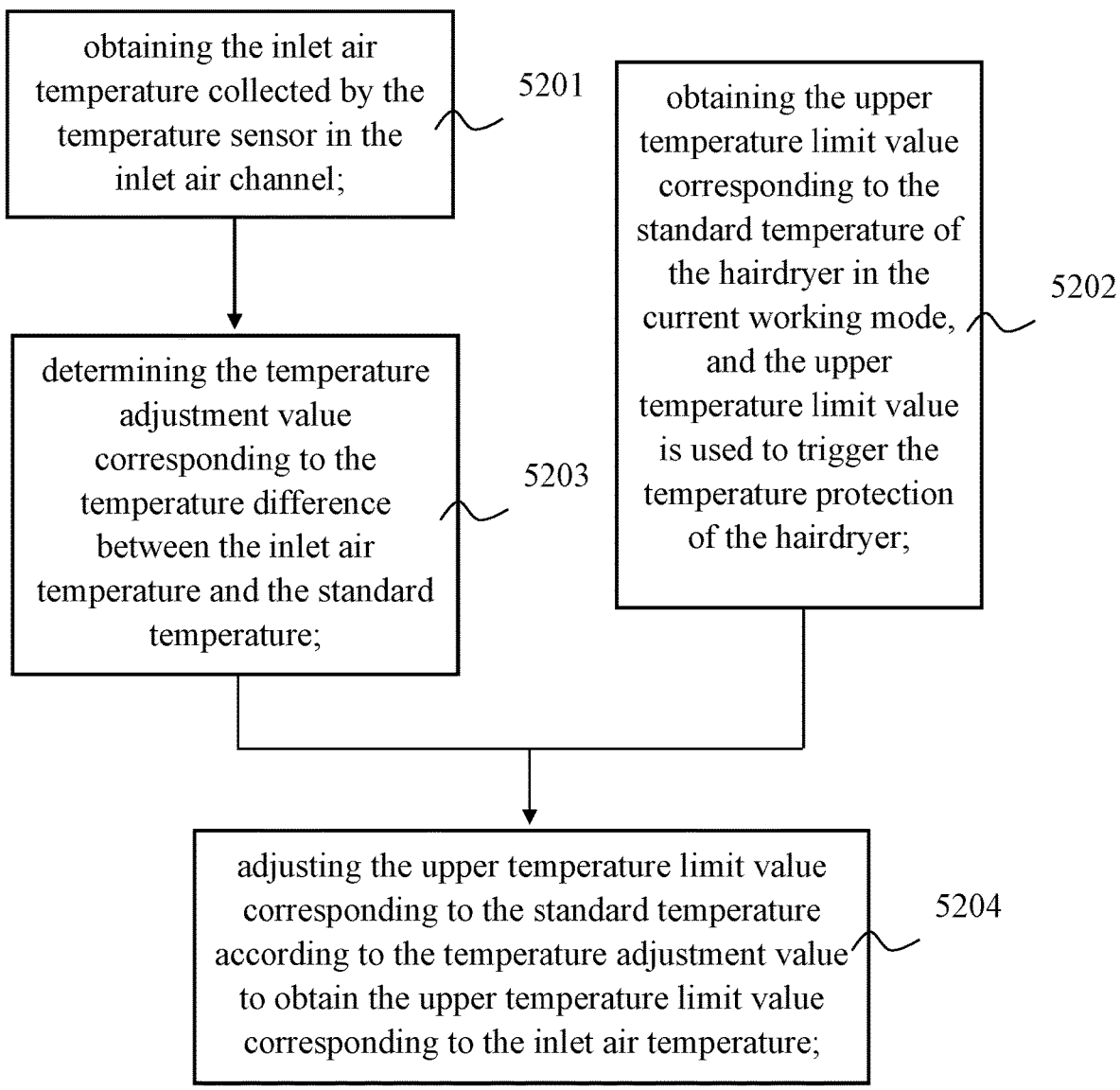
FIG. 17 is a flowchart of a hairdryer control method provided by an embodiment of the present disclosure.

FIG. 17 is a flowchart of a hairdryer control method provided by an embodiment of the present disclosure. In this embodiment, the method is applied to the hairdryer shown in FIG. 16, and the main body of each step is the processing component 5110 in the system. The method includes at least the following step:

step 5201, obtaining an air inlet temperature collected by the temperature sensor in the air inlet channel, and executing step 5203.

In a possible embodiment, the processing component triggers the temperature sensor in the air inlet channel to work after the hairdryer switches the working mode, and obtains the air inlet temperature collected by the temperature sensor in the air inlet channel. Alternatively, the processing component obtains the air inlet temperature collected by the temperature sensor in the air inlet channel in real time.

The method further includes the following step:

step 5202, obtaining the upper temperature limit value corresponding to the standard temperature of the hairdryer in the current working mode. The upper temperature limit value is adapted to trigger the temperature protection of the hairdryer, and step 5204 is executed.

The upper temperature limit value corresponding to the standard temperature is stored in the hairdryer. The standard temperature can be 25° C., 23° C., etc. In this embodiment, the value of the standard temperature is not limited.

In a possible embodiment, the upper temperature limit value corresponding to the standard temperature is different for different working modes. The working modes include a working range which includes a temperature control range and/or a wind speed control range. At this time, obtaining the upper temperature limit value corresponding to the standard temperature of the hairdryer in the current working mode, includes: obtaining the temperature corresponding relationship between the working range and the upper temperature limit value; and determining the upper temperature limit value corresponding to the standard temperature based on the corresponding relationship between the current working range and the temperature.

For example, the temperature correspondence between the working range and the upper temperature limit value is shown in a first table below. When the working range is a wind speed control range 1 and temperature control range 2, the upper temperature limit value corresponding to the standard temperature is 60° C.

TABLE 1

| working range | upper temperature limit value corresponding to the standard temperature |
|---|---|
| wind speed control range 1, temperature control range 1 | 55° C. |
| wind speed control range 1, temperature control range 2 | 60° C. |
| wind speed control range 2, temperature control range 1 | 57° C. |
| wind speed control range 2, temperature control range 2 | 70° C. |

In a possible embodiment, the step 5202 may be executed before the step 5201; or, it may be executed after the step 5201; or, it may be executed simultaneously with the step 5201.

The method further includes the following step:

step 5203, determining the temperature adjustment value corresponding to the temperature difference between the inlet air temperature and the standard temperature.

The temperature adjustment relationship between the temperature difference and the temperature adjustment value is stored in the hairdryer. In a possible embodiment, the temperature adjustment relationship can be the corresponding relationship between the temperature difference and the temperature adjustment value; or, it can also be an adjustment formula between the temperature difference and the temperature adjustment value. There is a positive correlation between the temperature difference and the temperature adjustment value. That is, the greater the temperature difference, the greater the temperature adjustment value; and the smaller the temperature difference, the smaller the temperature adjustment value.

In one example, different device information corresponds to different temperature adjustment relationships. At this time, the processing component obtains the device information of the hairdryer; determines the temperature adjustment relationship, which at least includes the corresponding relationship between the temperature difference and the temperature adjustment value, corresponding to the device information; and determines the temperature adjustment value based on the temperature difference and the temperature adjustment relationship.

In a possible embodiment, the device information includes a model of the hairdryer and/or a model of the heating device.

In another example, different device information corresponds to the same temperature adjustment relationship.

The method further includes the following step:

step 5204: adjusting the upper temperature limit value corresponding to the standard temperature according to the temperature adjustment value so as to obtain the upper temperature limit value corresponding to the inlet air temperature.

The processing component determines the sum of the upper temperature limit value corresponding to the standard temperature and the temperature adjustment value as the upper temperature limit value corresponding to the inlet air temperature.

In a possible embodiment, after the processing component determines the upper temperature limit value corresponding to the air inlet temperature, the hairdryer is temperature protected according to the upper temperature limit value corresponding to the air inlet temperature within a preset duration after the hairdryer is switched to the current working mode.

The preset duration is determined based on the duration when the outlet temperature of the outlet channel of the hairdryer reaches a stable time period after the hairdryer is switched to the current working mode. The preset duration is greater than or equal to the duration when the air outlet temperature of the air outlet channel reaches the stable time period.

Figure 18:
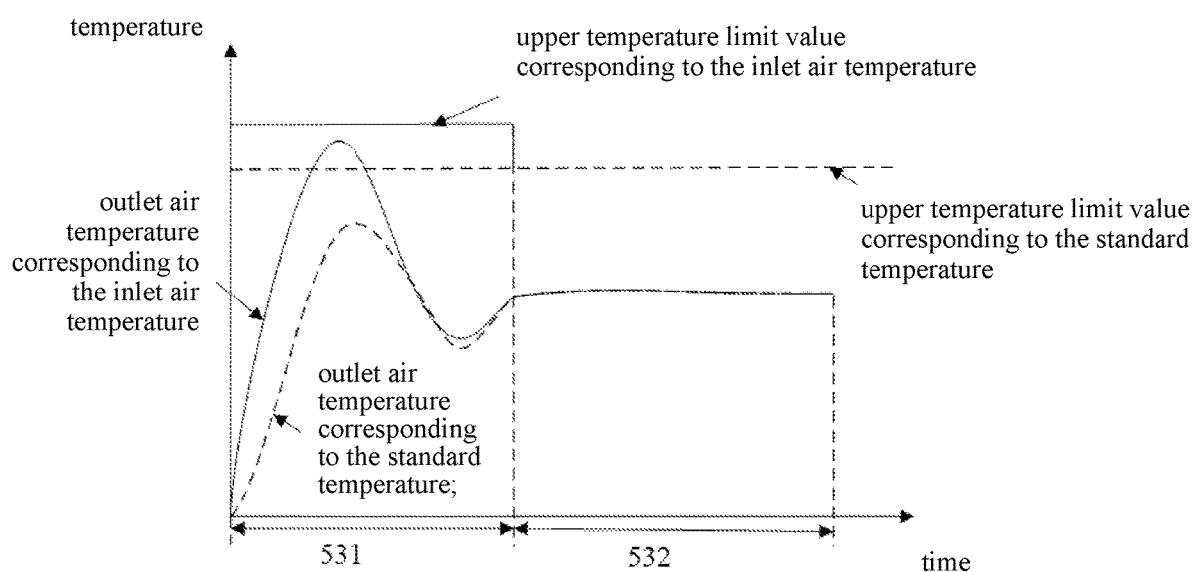
FIG. 18 is a schematic diagram of adjusting an upper temperature limit value provided by an embodiment of the present disclosure.

Referring to FIG. 18, since the outlet temperature is unstable and abrupt within a period of time after the hairdryer is switched to the current operating mode, refer to stage 531 in FIG. 18. In the stage 531, there is a high probability that the outlet air temperature in the high-temperature environment exceeds the upper temperature limit value corresponding to the standard temperature. However, in the outlet temperature stage 532, the probability that the outlet temperature in the high-temperature environment exceeds the upper temperature limit value corresponding to the standard temperature is small. In the stage 531, if the outlet temperature exceeds the upper temperature limit value corresponding to the standard temperature, the normal operation of the hairdryer will not be affected. Therefore, only the upper temperature limit value of the stage 531 needs to be adjusted.

In a possible embodiment, when the air outlet temperature of the air outlet channel of the hairdryer is greater than or equal to the upper temperature limit value corresponding to the air inlet temperature, the way for the processing component to protect the temperature of the hairdryer includes controlling the hairdryer to stop working. Of course, the temperature of the hairdryer can also be protected by reducing the working power of the hairdryer. This embodiment does not limit the method of temperature protection of the hairdryer by the processing component.

In summary, the hairdryer control method provided in this embodiment can solve the problem that the hairdryer may be shut down by mistake by using a fixed upper temperature limit value for temperature protection control in a high-temperature environment, via setting the additional temperature sensor in the air inlet channel of the hairdryer to collect the inlet temperature in the air inlet channel; obtaining the upper temperature limit value corresponding to the standard temperature of the hairdryer in the current working mode, and the upper temperature limit value is adapted to trigger the temperature protection of the hairdryer; determining the temperature adjustment value corresponding to the temperature difference between the inlet air temperature and the standard temperature; and adjusting the upper temperature limit value corresponding to the standard temperature according to the temperature adjustment value so as to obtain the upper temperature limit value corresponding to the inlet air temperature. Since the corresponding upper temperature limit value can be adjusted under high-temperature environment, using the adjusted upper temperature limit value for temperature protection control can reduce the probability of false shutdown of the hairdryer and improve the accuracy of temperature protection control.

Figure 19:
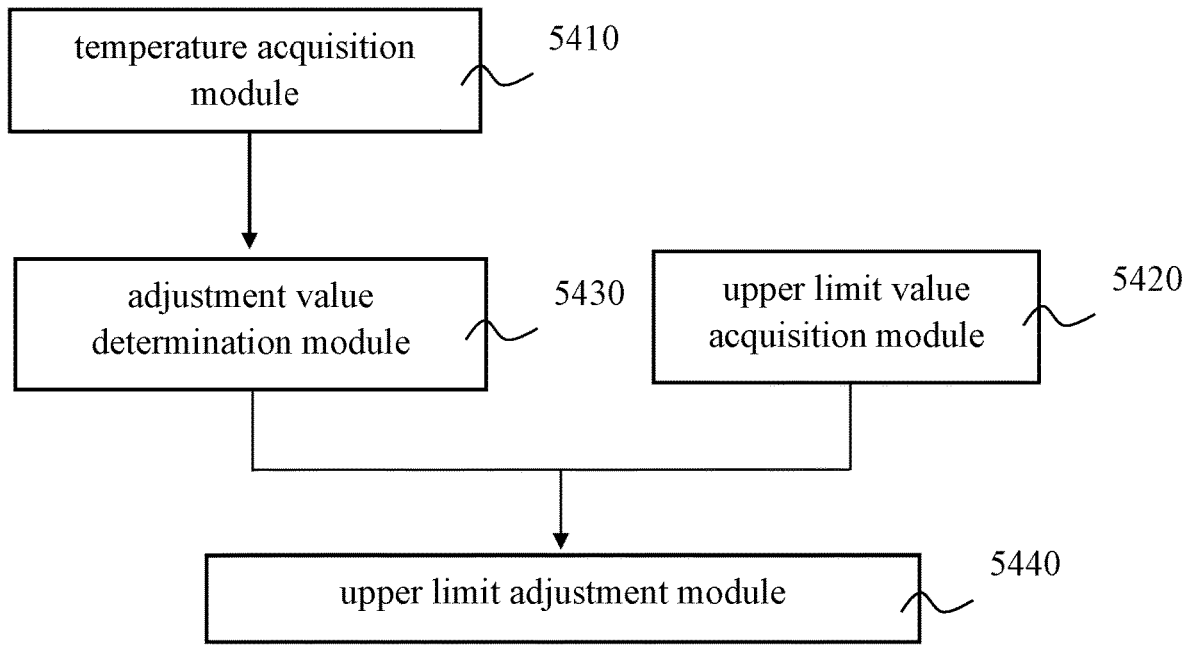
FIG. 19 is a block diagram of a hairdryer control device provided by an embodiment of the present disclosure.

FIG. 19 is a block diagram of a hairdryer control device provided in an embodiment of the present disclosure. The present embodiment takes the application of the device to the hairdryer shown in FIG. 16 as an example. The air inlet channel of the hairdryer is provided with a temperature sensor. The device includes at least the following modules: a temperature acquisition module 5410, an upper limit value acquisition module 5420, an adjustment value determination module 5430, and an upper limit value adjustment module 5440.

The temperature acquisition module 5410 is adapted to obtain the air inlet temperature collected by the temperature sensor on the air inlet channel.

The upper limit value acquisition module 5420 is adapted to obtain the upper limit value of the temperature corresponding to the standard temperature of the hairdryer in the current working mode. The upper temperature limit value is adapted to trigger the temperature protection of the hairdryer.

The adjustment value determination module 5430 is adapted to determine the temperature adjustment value corresponding to the temperature difference between the air inlet temperature and the standard temperature.

The upper limit value adjustment module 5440 is adapted to adjust the upper limit value of the temperature corresponding to the standard temperature according to the temperature adjustment value so as to obtain the upper limit value of the temperature corresponding to the air inlet temperature.

Relevant details can be referred to the above method embodiment.

It should be noted that when the hairdryer control device provided in the above embodiment controls the hairdryer, only the division of the above functional modules is illustrated. In practical applications, the above functions can be allocated by different functional modules according to needs. That is, the internal structure of the hairdryer control device is divided into different functional modules to complete all or part of the functions described above. In addition, the hairdryer control device provided by the above embodiment belongs to the same concept as the hairdryer control method embodiment. The specific implementation process of the hairdryer control device can be referred to the method embodiment in detail, which will not be repeated here.

Figure 20:
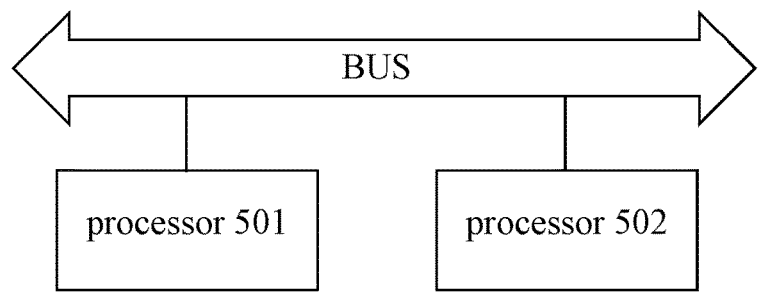
FIG. 20 is a block diagram of a hairdryer control device provided by an embodiment of the present disclosure.

FIG. 20 is a block diagram of a hairdryer control device provided by the embodiment of the present disclosure. The hairdryer control device includes at least a processor 501 and a memory 502.

The processor 501 may include one or more processing cores, such as a 4-core processor, an 8-core processor, etc. The processor 51 can be implemented in at least one hardware form of DSP (Digital Signal Processing), FPGA (Field-Programmable Gate Array) and PLA (Programmable Logic Array). The processor 51 may also include a main processor and a coprocessor. The main processor is a processor adapted to process data in a wake-up state, which is also known as a CPU (Central Processing Unit). The coprocessor is a low-power processor for processing data in a standby mode.

The memory 502 may include one or more computer-readable storage media. The computer-readable storage medium may be non-transient. The memory 502 may also include a high-speed random access memory and a nonvolatile memory, such as one or more disk storage devices and flash storage devices. In some embodiments, a non-transient computer-readable storage medium in the memory 502 is adapted to store at least one instruction. The at least one instruction is executed by the processor 501 to implement the hairdryer control method provided by the method embodiment of the present disclosure.

In some embodiments, the hairdryer control device also optionally includes a peripheral interface and at least one peripheral device. The processor 501, the memory 502 and the peripheral device interface can be connected through a BUS or a signal line. Each peripheral device can be connected with the peripheral device interface through a BUS, a signal line or a circuit board. Schematically, the peripheral devices include but are not limited to an audio circuit and a power supply, etc.

Of course, the hairdryer control device may also include fewer or more components, which is not limited in the present embodiment.

In a possible embodiment the present disclosure also provides a computer-readable storage medium having a program stored in the computer-readable storage medium. The program is loaded and executed by the processor to implement the hairdryer control method of the above method embodiment.

In a possible embodiment, the present disclosure also provides a computer product. The computer product includes a computer-readable storage medium having a program stored in the computer-readable storage medium. The program is loaded and executed by the processor to implement the hairdryer control method of the above method embodiment.

The technical features of the above embodiments can be combined arbitrarily. In order to simplify the description, all possible combinations of each technical feature in the above embodiment are not described. However, as long as there is no contradiction in the combination of these technical features, they should be considered to be the scope recorded in this specification.

The above embodiments only express several embodiments of the present disclosure, and the description is more specific and detailed, but it cannot be understood as limiting the scope of the present disclosure. It should be noted that for those skilled in the art, multiple modifications and improvements can be made without departing from the concept of the disclosure, which shall belong to the protection scope of the present disclosure. Therefore, the protection scope of the present disclosure shall be subject to the appended claims.

What is claimed is:

1. A hairdryer control method, wherein a temperature sensor is disposed in an air inlet channel of a hairdryer, the hairdryer control method comprising:
    obtaining an air inlet temperature collected by the temperature sensor in the air inlet channel;
    obtaining a first upper temperature limit value corresponding to the standard temperature in a current working mode, the first upper temperature limit value being adapted to trigger temperature protection of the hairdryer;
    determining a temperature adjustment value corresponding to a temperature difference between the air inlet temperature and the standard temperature; and
    adjusting the first upper temperature limit value corresponding to the standard temperature according to the temperature adjustment value so as to obtain a second upper temperature limit value corresponding to the air inlet temperature.

2. The hairdryer control method according to claim 1, wherein determining the temperature adjustment value corresponding to the temperature difference between the air inlet temperature and the standard temperature, comprises:
    obtaining device information of the hairdryer;
    determining a temperature adjustment relationship corresponding to the device information, the temperature adjustment relationship at least comprising a corresponding relationship between the temperature difference and the temperature adjustment value; and
    determining the temperature adjustment value based on the temperature difference and the temperature adjustment relationship.

3. The hairdryer control method according to claim 2, wherein the device information comprises a model of the hairdryer and/or a model of the heating device.

4. The hairdryer control method according to claim 1, wherein obtaining the first upper temperature limit value corresponding to the standard temperature in the current working mode, comprises:
    obtaining a temperature corresponding relationship between a working range and the first upper temperature limit value; and determining the first upper temperature limit value corresponding to the standard temperature based on the working range and the temperature corresponding relationship.

5. The hairdryer control method according to claim 1, further comprising:
performing temperature protection of the hairdryer according to the second upper temperature limit value corresponding to the air inlet temperature, within a preset duration after the hairdryer is switched to the current working mode.

6. The hairdryer control method according to claim 5, wherein a value of the preset duration is determined based on a duration when an air outlet temperature of an air outlet channel of the hairdryer reaches a stable level after the hairdryer is switched to the current working mode.

7. The hairdryer control method according to claim 5, wherein performing the temperature protection of the hairdryer according to the second upper temperature limit value corresponding to the air inlet temperature, comprises:
controlling the hairdryer to stop working, when an air outlet temperature of an air outlet channel of the hairdryer is greater than or equal to the second upper temperature limit value corresponding to the air inlet temperature.

8. The hairdryer control method according to claim 1, further comprising:
obtaining a temperature detection window, the temperature detection window being adapted to collect temperature values within a preset window duration which is determined based on a current detection time; and
determining whether a current output temperature of the hairdryer is stable or not based on each temperature value in the temperature detection window.

9. The hairdryer control method according to claim 8, wherein determining whether the current output temperature of the hairdryer is stable or not based on each temperature value in the temperature detection window, comprises:
obtaining a maximum temperature value and a minimum temperature value in the temperature detection window;
calculating a difference between the maximum temperature value and the minimum temperature value;
determining that the current output temperature of the hairdryer is unstable and sending a prompt signal, when the difference is less than a preset desired temperature threshold; and
determining that the current output temperature of the hairdryer is stable, when the difference is greater than the preset desired temperature threshold.

10. The hairdryer control method according to claim 8, wherein determining whether the current output temperature of the hairdryer is stable or not based on each temperature value in the temperature detection window, comprises:
obtaining an average temperature value in the temperature detection window;
determining that the current output temperature of the hairdryer is unstable and sending a prompt signal, when the average temperature value is greater than a preset desired temperature threshold; and
determining that the current output temperature of the hairdryer is stable, when the average temperature value is less than the preset desired temperature threshold.

11. The hairdryer control method according to claim 10, wherein the preset desired temperature threshold is determined based on an average temperature of a corresponding temperature detection window at a previous time.

12. The hairdryer control method according to claim 8, wherein obtaining the temperature detection window, comprises:
determining the current detection time as an upper limit value of the temperature detection window, and determining a time corresponding to a preset window duration before the current detection time as a lower limit value of the temperature detection window, so as to obtain the temperature detection window.

13. The hairdryer control method according to claim 8, wherein obtaining the temperature detection window, comprises:
determining the current detection time as a lower limit value of the temperature detection window, and determining a time corresponding to a preset window duration after the current detection time as an upper limit value of the temperature detection window, so as to obtain the temperature detection window.

14. The hairdryer control method according to claim 8, further comprising:
determining whether or not a start-up duration of a heating device reaches a preset duration; and triggering a step of obtaining the temperature detection window, when the start-up duration of the heating device reaches the preset duration.

15. The hairdryer control method according to claim 1, further comprising:
obtaining a temperature value at each point of an air outlet of the hairdryer; and
adjusting working parameters of a heating device by a control device according to the temperature value obtained at each point of the air outlet of the hairdryer.

16. The hairdryer control method according to claim 15, wherein adjusting the working parameters of the heating device by the control device according to the temperature value obtained at each point of the air outlet of the hairdryer, comprises:
calculating an average value of the temperature value at each point of the air outlet of the hairdryer;
calculating an expected adjustment parameter value of the heating device according to the average value and a temperature control function; and
adjusting the working parameters of the heating device by the control device according to the expected adjustment parameter value.

17. The hairdryer control method according to claim 15, further comprising:
confirming test interval; and
determining whether or not a detection time for a next detection of the temperature value at each point is reached, after the working parameters of the heating device are adjusted by the control device; if yes, triggering a step of "obtaining a temperature value at each point of an air outlet of the hairdryer".

* * * * *